(12) United States Patent
Muraishi et al.

(10) Patent No.: US 10,707,460 B2
(45) Date of Patent: Jul. 7, 2020

(54) MANUFACTURING METHOD OF ASSEMBLED BATTERY

(71) Applicant: TOYOTA JIDOSHA KABUSHIKI KAISHA, Toyota-shi, Aichi-ken (JP)

(72) Inventors: Kazuki Muraishi, Toyota (JP); Keita Matsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/152,725

(22) Filed: Oct. 5, 2018

(65) Prior Publication Data

US 2019/0173063 A1 Jun. 6, 2019

(30) Foreign Application Priority Data

Dec. 6, 2017 (JP) ................. 2017-234397

(51) Int. Cl.
*H01M 2/04* (2006.01)
*H01M 2/10* (2006.01)
*B25B 11/00* (2006.01)
*B25B 11/02* (2006.01)
*B25F 5/00* (2006.01)

(52) U.S. Cl.
CPC ......... *H01M 2/105* (2013.01); *H01M 2/1016* (2013.01)

(58) Field of Classification Search
None
See application file for complete search history.

(56) References Cited

FOREIGN PATENT DOCUMENTS

| | | |
|---|---|---|
| JP | H06-063247 U | 9/1994 |
| JP | 2001-198840 A | 7/2001 |
| JP | 2017-096687 A | 6/2017 |

*Primary Examiner* — Yoshitoshi Takeuchi
(74) *Attorney, Agent, or Firm* — Oliff PLC

(57) ABSTRACT

In attaching a cover, the cover is attached to a placement jig such that positioning pins of the placement jig are respectively passed through a first bolt insertion portion and a second bolt insertion portion of the cover. In placing the cover, the cover is placed at a placement position on a first surface of a storage body such that the positioning pins of the placement jig to which the cover is attached are respectively inserted into a first fastening hole and a second fastening hole of the storage body.

7 Claims, 16 Drawing Sheets

MANUFACTURING METHOD OF ASSEMBLED BATTERY

INCORPORATION BY REFERENCE

The disclosure of Japanese Patent Application No. 2017-234397 filed on Dec. 6, 2017 including the specification, drawings and abstract is incorporated herein by reference in its entirety.

BACKGROUND

1. Technical Field

The disclosure relates to a manufacturing method of an assembled battery.

2. Description of Related Art

Japanese Unexamined Patent Application Publication No. 2017-96687 (JP 2017-96687 A) describes an assembled battery including an assembled battery intermediate body including a plurality of cells and a storage body in which the cells are accommodated, and a plate-shaped cover (a discharge-air chamber cover) placed at a predetermined placement position on a first surface of the storage body so as to cover the first surface of the storage body. Note that the storage body is constituted by a battery holder, a positive bus bar, a negative bus bar, a side cover, and so on. The first surface of the storage body is a surface exposed above or below the assembled battery intermediate body, for example.

SUMMARY

In the meantime, the plate-shaped cover that covers the first surface of the storage body may be required to be placed at the predetermined placement position on the first surface of the storage body appropriately (with a high positional accuracy). For example, in the assembled battery in JP 2017-96687 A, it is required that the first surface side of the storage body be sealed airtightly by the cover. On this account, it is required to place the cover at the predetermined placement position on the first surface of the storage body so that a sealing member provided on the cover is placed on a sealing surface included in the first surface of the storage body appropriately (with a high positional accuracy), for example.

As such, a manufacturing method that can place the plate-shaped cover that covers the first surface of the storage body at the predetermined placement position on the first surface of the storage body appropriately (with a high positional accuracy) has been required. Besides, a manufacturing method that can easily place the cover at the predetermined placement position on the first surface of the storage body without using large-scale facilities has been required.

The disclosure provides a manufacturing method of an assembled battery, the manufacturing method being able to place a cover that covers a first surface of a storage body at a predetermined placement position on the first surface of the storage body easily and appropriately.

A first aspect of the disclosure relates to a manufacturing method of an assembled battery. The assembled battery includes: an assembled battery intermediate body including a plurality of cells and a storage body in which the cells are accommodated; a cover placed at a placement position on a first surface of the storage body so as to cover the first surface, the cover being plate-shaped, the placement position being predetermined, and at least three attachment bolts with which the cover is attached to the assembled battery intermediate body. The storage body includes at least three fastening holes on the first surface side, the cover is attached to the assembled battery intermediate body with the with the fastening holes, and a shape of the fastening holes each including a female screw fitting a male screw formed in a shaft portion of the attachment bolt. The cover includes at least three bolt insertion portions each constituted by a through-hole or a notch portion. The bolt insertion portions are placed at positions facing the fastening holes of the storage body when the cover is placed at the placement position. The cover is fixed to the assembled battery intermediate body in a state where the shaft portion is passed through the bolt insertion portions of the cover placed at the placement position and the male screw is engaged threadedly with the female screw. The manufacturing method includes: attaching the cover to a placement jig configured to place the cover at the placement position such that a surface of the cover makes contact with a surface of a jig body portion included in the placement jig and having a flat-plate shape; placing the cover at the placement position by moving the placement jig to which the cover is attached such that the placement jig approaches the assembled battery intermediate body fixed on a pedestal in a posture where the first surface faces the cover; and fastening and fixing the cover to the assembled battery intermediate body with the attachment bolts such that the shaft portion is passed through the bolt insertion portion of the cover placed at the placement position and the male screws of the attachment bolts are engaged threadedly with the female screws of the fastening holes facing the bolt insertion portions. The placement jig includes at least two positioning pins projecting from the surface of the jig body portion. When the cover is attached to the placement jig, the positioning pins are respectively passed through a first bolt insertion portion and a second bolt insertion portion as the bolt insertion portions, such that the cover is positioned with respect to the placement jig. In placing the cover, the positioning pins are placed at positions where the positioning pins are respectively inserted into a first fastening hole and a second fastening hole as the fastening holes when the cover attached to the placement jig is placed at the placement position. In attaching the cover, the positioning pins are respectively passed through the first bolt insertion portion and the second bolt insertion portion of the cover, such that the cover is attached to the placement jig. In placing the cover, the positioning pins are respectively inserted into the first fastening hole and the second fastening hole such that the cover is placed at the placement position on the first surface of the storage body.

The manufacturing method is a method for manufacturing "an assembled battery in which a cover is fixed to an assembled battery intermediate body in a state where shaft portions of attachment bolts are passed through bolt insertion portions of the cover placed at a placement position on a first surface of a storage body and male screws of the attachment bolts are engaged threadedly with female screws of fastening holes." In the manufacturing method, the cover is placed at the placement position on the first surface of the storage body by use of the placement jig configured to place the cover at the placement position of the storage body.

More specifically, first, in the attaching of the cover (an attachment step), the cover is attached to the placement jig in a state where a surface (top face) of the cover is brought into contact with a surface (bottom face) of the flat-shaped jig body portion provided in the placement jig. After that, in the placing of the cover (a placing step), the cover is placed at the placement position on the first surface of the storage body by moving the placement jig to which the cover is attached (by moving the placement jig downward from the upper side) so that the placement jig approaches the assembled battery intermediate body fixed on the pedestal in a posture where the first surface faces the cover (faces upward).

Note that the cover has at least three bolt insertion portions each constituted by a through-hole or a notch portion. The bolt insertion portions are formed at positions facing the fastening holes of the storage body at the time when the cover is placed at the placement position on the first surface of the storage body.

In the meantime, the placement jig to be use in the manufacturing method includes the positioning pins extending straight in the axis direction so as to project downward from the bottom face of the jig body portion. Those positioning pins are provided so as to pass through the first bolt insertion portion and the second bolt insertion portion as the bolt insertion portions when the cover is attached to the placement jig, thereby positioning the cover with respect to the placement jig. Accordingly, in the attachment step, the cover is attached to the placement jig such that the positioning pins of the placement jig are passed through the first bolt insertion portion and the second bolt insertion portion of the cover.

Besides, the positioning pins of the placement jig are placed at positions where the positioning pins are inserted into the first fastening hole and the second fastening hole as the fastening holes when the cover is placed at the placement position of the storage body in the placing step. Accordingly, in the placing step, when the placement jig to which the cover is attached is moved downward from above the assembled battery intermediate body fixed on the pedestal in the posture where the first surface faces upward and the positioning pins of the placement jig to which the cover is attached are inserted into the first fastening hole and the second fastening hole of the storage body, the cover can be placed at the placement position on the first surface of the storage body appropriately (with a high positional accuracy).

As described above, with the above manufacturing method, the cover can be placed at a predetermined placement position on the first surface of the storage body easily and appropriately (with a high positional accuracy).

After that, in the fastening and fixing of the cover to the assembled battery intermediate body (a fixing step), the shaft portions of at least three attachment bolts are passed through the bolt insertion portions of the cover placed at the placement position and the male screws of the at least three attachment bolts are engaged threadedly with the female screws of the fastening holes facing the bolt insertion portions, so that the cover is fastened and fixed to the assembled battery intermediate body with the attachment bolts. Hereby, the cover can be fixed to the assembled battery intermediate body in a state where the cover is placed at the placement position on the first surface of the storage body.

Note that an example of the fastening hole may be a fastening hole configured such that a female screw fitting the male screw of the attachment bolt is formed over the whole fastening hole in its axis direction (a direction where the central axis extends), for example.

Further, the fastening hole also includes a fastening hole constituted by two holes (a first hole and a second hole) aligned in the axis direction of the attachment bolt. An example of the fastening hole may be a fastening hole constituted by a first hole (an insertion hole through which the shaft portion of the attachment bolt is passed) having no female screw and opened on the first surface of the storage body, and a second hole (a screw hole) placed on the opposite side from the first surface side across the first hole and having a female screw fitting the male screw of the attachment bolt, for example. The first hole and the second hole may be formed in one member so that the first hole and the second hole constitute a series of fastening holes. Alternatively, the first hole and the second hole may be formed separately in two different members such that the first hole and the second hole are aligned in the axis direction of the attachment bolt. Further, the inside diameter of the first hole may be larger than the inside diameter of the second hole.

In the manufacturing method of the first aspect, the assembled battery may include four attachment bolts. The storage body may have a rectangular outer shape in a plan view viewed from the first surface side. Four fastening holes are provided with the first surface such that the fastening holes are respectively placed at four corners of the storage body in the plan view viewed from the first surface side. The cover may have a rectangular shape such that four bolt insertion portions are respectively placed at four corners of the cover. The positioning pins may extend straight in an axis direction. The first bolt insertion portion and the second bolt insertion portion may be respectively placed at two corners out of the four corners of the cover, the two corners of the cover being placed on one diagonal line of the cover. The first fastening hole and the second fastening hole may be respectively placed at two corners out of the four corners of the storage body, the two corners of the storage body being placed on one diagonal line of the storage body in the plan view viewed from the first surface side.

The "rectangular shape" of the storage body and the cover is not limited to a strict rectangular shape, and also includes a shape approximate or similar to a rectangular shape.

In the manufacturing method of the first aspect, the jig body portion may have a rectangular shape with two chamfered corners such that, when the cover is attached to the placement jig, a third bolt insertion portion and a fourth bolt insertion portion among the four bolt insertion portions of the cover are exposed from the jig body portion without being covered with the jig body portion, the third bolt insertion portion and the fourth bolt insertion portion being different from the first bolt insertion portion and the second bolt insertion portion. In fastening and fixing the cover to the assembled battery intermediate body, the cover may be fixed to the assembled battery intermediate body with two attachment bolts among the four attachment bolts in such a manner that, while a state where the positioning pins are respectively inserted into the first fastening hole and the second fastening hole of the storage body and the cover is placed at the placement position is maintained, the shaft portion of a first attachment bolt among the two attachment bolts is passed through the third bolt insertion portion of the cover and the male screw of the first attachment bolt is engaged threadedly with the female screw of a third fastening hole facing the third bolt insertion portion among the four fastening holes of the storage body, and the shaft portion of a second attachment bolt among the two attachment bolts is passed through the fourth bolt insertion portion of the cover and the male screw of the second attachment bolt is engaged threadedly with the female screw of a fourth fastening hole facing the fourth bolt insertion portion among the four fastening holes of the storage body, and the cover may be fixed to the assembled battery intermediate body with the four attachment bolts in such a manner that the placement jig is removed from the cover after fixing the cover to the assembled battery intermediate body with the two attachment bolts, such that the positioning pins are removed from the first bolt insertion portion and the second bolt insertion portion of the cover and the first fastening hole and the second fastening hole of the storage body, and the shaft portion of a third attachment bolt among the four attachment bolts is passed through the first bolt insertion portion of the cover and the male screw of the third attachment bolt is engaged threadedly with the female screw of the first fastening hole of the storage body, and the shaft portion of a fourth attachment bolt among the four attachment bolts is passed through the second bolt insertion portion of the cover and the male screw of the fourth attachment bolt is engaged threadedly with the female screw of the second fastening hole of the storage body.

As the fixing step of fastening and fixing the cover to the assembled battery intermediate body with the attachment bolts, the manufacturing method includes fixing the cover to the assembled battery intermediate body with two attachment bolts (a first fixing step), and fixing of the cover to the assembled battery intermediate body with four attachment bolts (a second fixing step).

More specifically, first, in the first fixing step, while a state where the positioning pins of the placement jig to which the cover is attached are inserted into the first fastening hole and the second fastening hole of the storage body and the cover is placed at the placement position is maintained, the shaft portion of the first attachment bolt is passed through the third bolt insertion portion of the cover and the male screw of the first attachment bolt is engaged threadedly with the female screw of the third fastening hole of the storage body, and the shaft portion of the second attachment bolt is passed through the fourth bolt insertion portion of the cover and the male screw of the second attachment bolt is engaged threadedly with the female screw of the fourth fastening hole of the storage body, so that the cover is fixed to the assembled battery intermediate body with the two attachment bolts.

That is, in the placing step, the positioning pins of the placement jig to which the cover is attached are inserted into the first fastening hole and the second fastening hole of the storage body so that the cover is placed at the placement position, and after that, the first fixing step is performed while this state is maintained. With such a configuration, the state where the cover is placed at the placement position can be maintained by the placement jig (the positioning pins) after the placing step but before the first fixing step is finished.

Accordingly, in the first fixed step, while the state where the cover is placed at the placement position by the placement jig is maintained, the cover can be fastened and fixed to the assembled battery intermediate body with two attachment bolts. Hereby, when the cover is fastened to the assembled battery intermediate body with two attachment bolts, it is possible to prevent the cover from being displaced from the placement position. Accordingly, the cover can be fixed at the placement position on the first surface of the storage body by the first fixing step.

Note that the jig body portion of the placement jig has a rectangular shape with two chamfered corners of a rectangular shape in a plan view so that, when the cover is attached to the placement jig, the third bolt insertion portion and the fourth bolt insertion portion among the four bolt insertion portions of the cover are exposed above the placement jig from the jig body portion without being covered with the jig body portion, the third bolt insertion portion and the fourth bolt insertion portion being two bolt insertion portions different from the first bolt insertion portion and the second bolt insertion portion. With the use of the placement jig including the jig body portion having such a shape, the first fixing step can be performed.

More specifically, in a state where the positioning pins of the placement jig to which the cover is attached are inserted into the first fastening hole and the second fastening hole of the storage body so that the cover attached to the placement jig is placed at the placement position, the third bolt insertion portion and the fourth bolt insertion portion of the cover can be exposed above the placement jig. Hereby, the cover can be fastened and fixed to the assembled battery intermediate body with two attachment bolts by use of the third bolt insertion portion and the fourth bolt insertion portion of the cover and the third fastening hole and the fourth fastening hole, of the storage body, that face the third bolt insertion portion and the fourth bolt insertion portion.

After the first fixing step, the second fixing step is performed. More specifically, the cover is removed from the placement jig after the first fixing step but before the second fixing step, so that the positioning pins are removed from the first bolt insertion portion and the second bolt insertion portion of the cover and the first fastening hole and the second fastening hole of the storage body. In the second fixing step, in this state, the shaft portion of the third attachment bolt is passed through the first bolt insertion portion of the cover and the male screw of the third attachment bolt is engaged threadedly with the female screw of the first fastening hole of the storage body, and the shaft portion of the fourth attachment bolt is passed through the second bolt insertion portion of the cover and the male screw of the fourth attachment bolt is engaged threadedly with the female screw of the second fastening hole of the storage body. Hereby, the cover can be fixed to the assembled battery intermediate body with four attachment bolts in total in a state where the cover is placed at the placement position on the first surface of the storage body.

As described above, with the above manufacturing method, the cover can be fixed to the assembled battery intermediate body more appropriately (with a high positional accuracy) in a state where the cover is placed at the placement position on the first surface of the storage body.

In the manufacturing method of the first aspect, a magnet may be provided on the surface of the jig body portion. The cover may include a plate-shaped cover body portion made of a magnetic body. In attaching the cover, the cover may be attached to the placement jig such that the cover body portion is connected to the magnet by magnetic force of the magnet.

In the manufacturing method, the placement jig provided with the magnet on the bottom face of the jig body portion is used as a placement jig. Further, the cover including the plate-shaped cover body portion made of a magnetic body is used as a cover. Hereby, in the attachment step, the cover can be attached to the placement jig just by connecting the cover (the cover body portion) to the magnet by magnetic force. Accordingly, with the manufacturing method, the cover can be easily attached to the placement jig.

In the manufacturing method of the first aspect, a magnet may be provided on the surface of the jig body portion. The cover may include a plate-shaped cover body portion made of a magnetic body. In attaching the cover, the cover may be attached to the placement jig such that the cover body portion is connected to the magnet by magnetic force of the magnet. After fixing the cover to the assembled battery intermediate body with the two attachment bolts but before fixing the cover to the assembled battery intermediate body with the four attachment bolts, the placement jig may be moved in a direction where the surface of the jig body portion is distanced from the cover, so that the magnet is separated from the cover fixed to the assembled battery intermediate body with the two attachment bolts and the cover is removed from the placement jig.

In the manufacturing method, the placement jig provided with the magnet on the bottom face of the jig body portion is used as a placement jig. Further, the cover including the plate-shaped cover body portion made of a magnetic body is used as a cover. Hereby, in the attachment step, the cover can be attached to the placement jig just by connecting the cover (the cover body portion) to the magnet by magnetic force. Accordingly, with the manufacturing method, the cover can be easily attached to the placement jig.

Further, in the above manufacturing method, the placement jig is moved upward (in a direction away from the first surface) after the first fixing step but before the second fixing step. Hereby, the cover fixed to the assembled battery intermediate body with two attachment bolts is separated from the magnet so that the cover is removed from the placement jig. By performing the first fixing step, the cover is fixed to the assembled battery intermediate body with two attachment bolts. Accordingly, just by moving the placement jig upward (in the direction away from the first surface) after the first fixing step but before the second fixing step, the magnet can be separated from the cover and the placement jig can be removed from the cover. Accordingly, with the manufacturing method, the cover can be easily removed from the placement jig.

In the manufacturing method of the first aspect, the cover may include a cover body portion with a plate shape, and an annular sealing member provided over a whole peripheral portion of the cover body portion. In placing the cover, the cover may be placed at the placement position such that, in a state where the positioning pins of the placement jig to which the cover is attached are inserted into the first fastening hole and the second fastening hole of the storage body such that the sealing member is brought into contact with an annular sealing surface included in the first surface, a load is applied to the cover in a direction where the cover approaches the first surface via the placement jig, such that the sealing member is sandwiched and compressed between the cover body portion and the sealing surface of the first surface and the sealing member is brought into close contact with the sealing surface. In fixing the cover to the assembled battery intermediate body with the two attachment bolts, while a state where the sealing member is brought into close contact with the sealing surface via the placement jig to which the cover is attached is maintained, the cover may be fastened and fixed to the assembled battery intermediate body with the two attachment bolts.

In the manufacturing method, the cover including the plate-shaped cover body portion and the annular sealing member provided over the whole peripheral portion of the cover body portion is used as a cover. In the placing step, the cover is placed at the placement position such that, in a state where the positioning pins of the placement jig to which the cover is attached are inserted into the first fastening hole and the second fastening hole of the storage body so that the sealing member is brought into contact with the annular sealing surface included in the first surface, a load is applied to the cover attached to the placement jig in the direction where the cover approaches the first surface via the placement jig, so that the sealing member is sandwiched and compressed between the cover body portion and the sealing surface of the first surface and the sealing member is brought into close contact with the sealing surface.

After that, in the first fixing step, while the state where the sealing member is brought into close contact with the sealing surface via the placement jig to which the cover is attached is maintained, the cover is fastened and fixed to the assembled battery intermediate body with two attachment bolts. With such a configuration, the cover can be fixed to the assembled battery intermediate body in the state where the sealing member makes close contact with the sealing surface, and deformation of the cover can be restrained.

For example, as another method for fixing the cover to the assembled battery intermediate body in the state where the sealing member makes close contact with the sealing surface, the following method can be employed. More specifically, in a state where the sealing member is brought into contact with the sealing surface, a part (a fastened portion) of the sealing member is first sandwiched and compressed between the cover body portion and the sealing surface by fastening the cover to the assembled battery intermediate body with one attachment bolt, so that the part of the sealing member makes close contact with the sealing surface. After that, other attachment bolts are sequentially fastened one by one in a similar manner, so that the cover is fixed to the assembled battery intermediate body in the state where the sealing member makes close contact with the sealing surface.

However, such a method is a method in which the sealing member is compressed by force to fasten the cover to the assembled battery intermediate body with the attachment bolt, and at the time of the fastening with the attachment bolt, a large load is locally applied to the fastened portion of the cover (a part placed around the bolt insertion portion), so that the cover might deform.

On the other hand, in the above manufacturing method, in a state where the whole annular sealing member provided over the whole peripheral portion of the cover body portion is brought into close contact with the annular sealing surface included in the first surface, the cover is fastened to the assembled battery intermediate body with the attachment bolts. That is, in a state where the sealing member has been already compressed (in other words, in a state where a load is applied to the whole peripheral portion of the cover body portion), the cover is fastened to the assembled battery intermediate body with the attachment bolts. On this account, at the time of the fastening with the attachment bolt, a large load is not locally applied to the fastened portion of the cover (a part placed around the bolt insertion portion), thereby making it possible to restrain the deformation of the cover.

Further, in the manufacturing method, the cover is fixed to the assembled battery intermediate body in a state where the whole annular sealing member provided over the whole peripheral portion of the cover body portion is brought into close contact with the annular sealing surface included in the first surface. This makes it possible to airtightly seal between the cover and the first surface (the sealing surface) of the storage body. In such an assembled battery, in a case where gas leaks (is discharged) from the cells for some abnormalities, for example, it is possible to prevent the gas from being discharged outside the assembled battery from the cover side (through between the cover and the storage body).

In the manufacturing method of the first aspect, the cover may be attached and the cover may be placed by use of a placement device including the placement jig, the pedestal, a placement jig moving mechanism, and a pedestal moving mechanism, the placement jig moving mechanism being configured to move the placement jig in a direction where the surface of the jig body portion is distanced from the cover and in a direction where the surface of the jig body portion approaches the cover, the pedestal moving mechanism being configured to move the pedestal in a direction where the surface of the jig body portion is distanced from the cover and in a direction where the surface of the jig body portion approaches the cover. The placement device may be configured such that, when the pedestal on which the assembled battery intermediate body is fixed is placed at a first position by use of the pedestal moving mechanism, a first positioning pin out of the two positioning pins and the first fastening hole face each other in an axis direction of the first positioning pin and a second positioning pin out of the two positioning pins and the second fastening hole face each other in an axis direction of the second positioning pin. In attaching the cover, the cover may be attached to the placement jig such that the positioning pins of the placement jig are respectively passed through the first bolt insertion portion and the second bolt insertion portion of the cover. In placing the cover, the cover may be placed at the placement position on the first surface of the storage body such that, in a state where the pedestal on which the assembled battery intermediate body is fixed is placed at the first position, the placement jig to which the cover is attached is moved by use of the placement jig moving mechanism in the direction where the surface of the assembled battery intermediate body approaches the cover, such that the positioning pins of the placement jig to which the cover is attached are respectively inserted into the first fastening hole and the second fastening hole.

In the manufacturing method, the attachment step and the placing step are performed by use of the placement device including the placement jig, the pedestal, the placement jig moving mechanism configured to move the placement jig in the up-down direction, and the pedestal moving mechanism configured to move the pedestal in the front-rear direction perpendicular to the up-down direction.

The placement device is configured such that, when the pedestal on which the assembled battery intermediate body is fixed is placed at the first position that is a position right below the placement jig, the first positioning pin out of the two positioning pins and the first fastening hole face each other in the axis direction of the first positioning pin (a direction along the up-down direction), and the second positioning pin out of the two positioning pins and the second fastening hole face each other in the axis direction of the second positioning pin (the direction along the up-down direction).

On this account, in the placing step, in a state where the pedestal on which the assembled battery intermediate body is fixed is placed at the first position, the placement jig to which the cover is attached is moved downward by use of the placement jig moving mechanism from the position above the assembled battery intermediate body, so that the positioning pins of the placement jig to which the cover is attached can be inserted into the first fastening hole and the second fastening hole of the storage body appropriately. Hereby, the cover can be placed at the placement position on the first surface of the storage body appropriately (with a high positional accuracy).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

Figure 1:
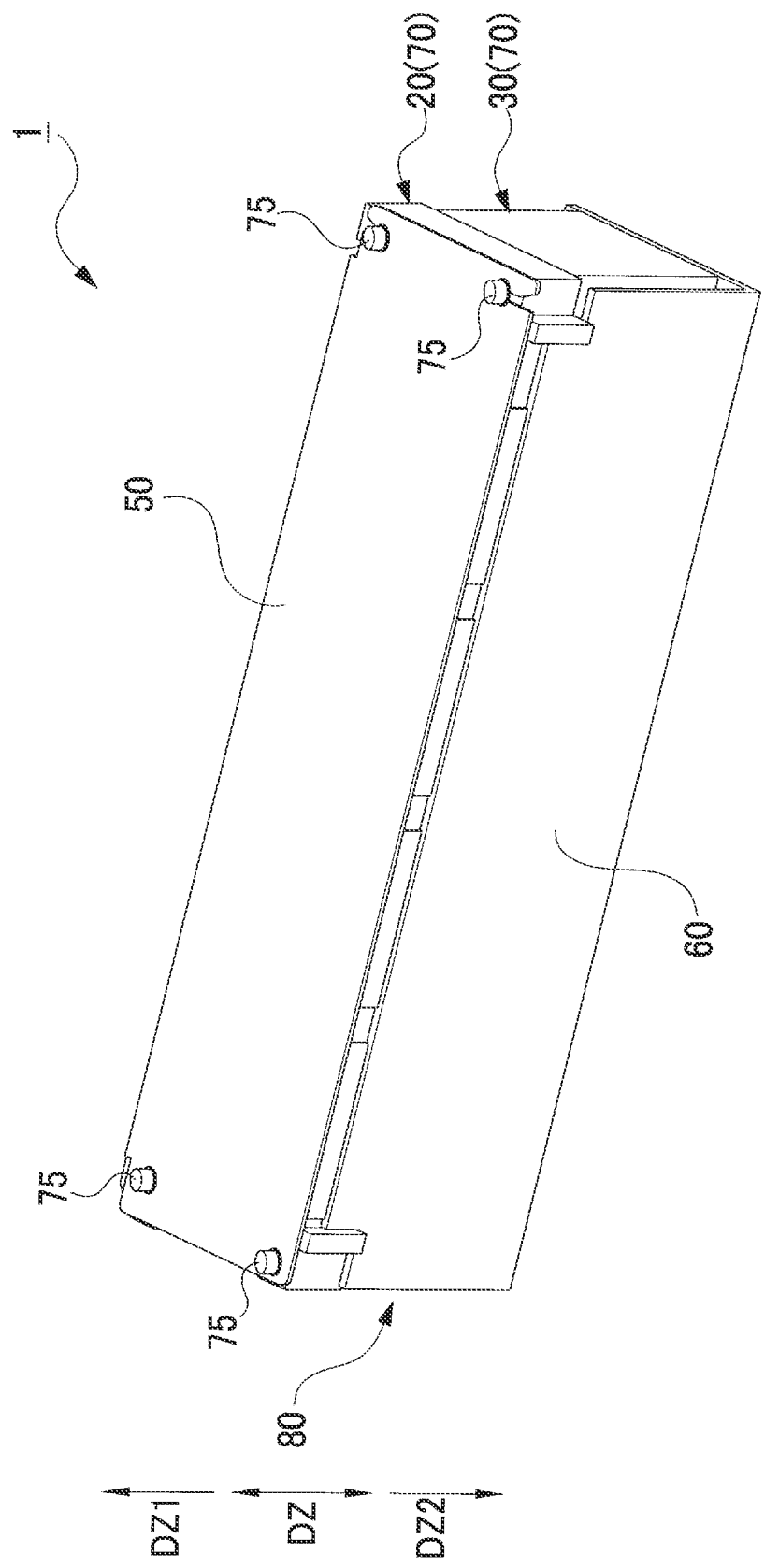
FIG. 1 is a perspective view of an assembled battery according to an embodiment.
Figure 2:
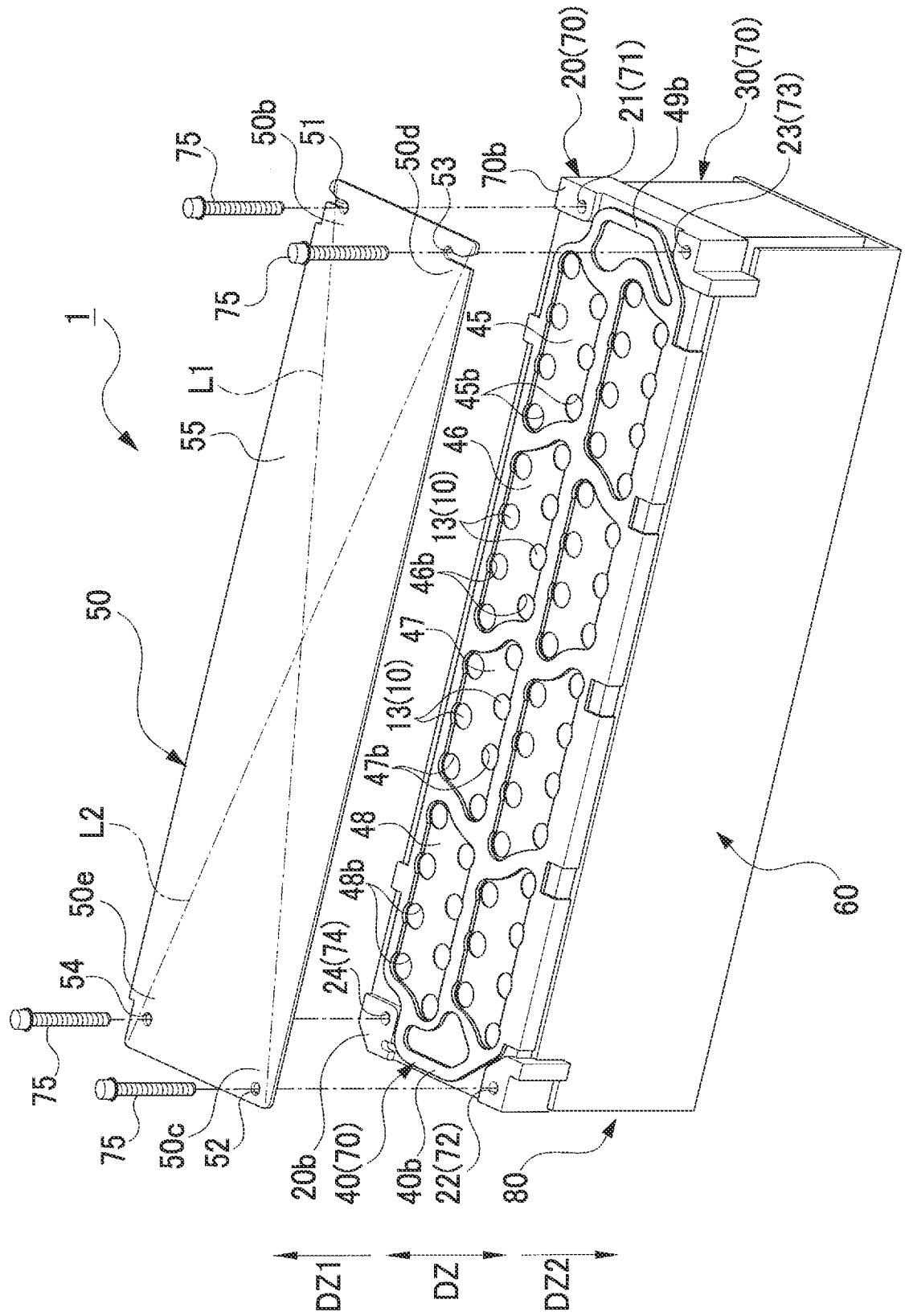
FIG. 2 is a perspective view of a state where a cover 50 is removed from the assembled battery.
Figure 3:
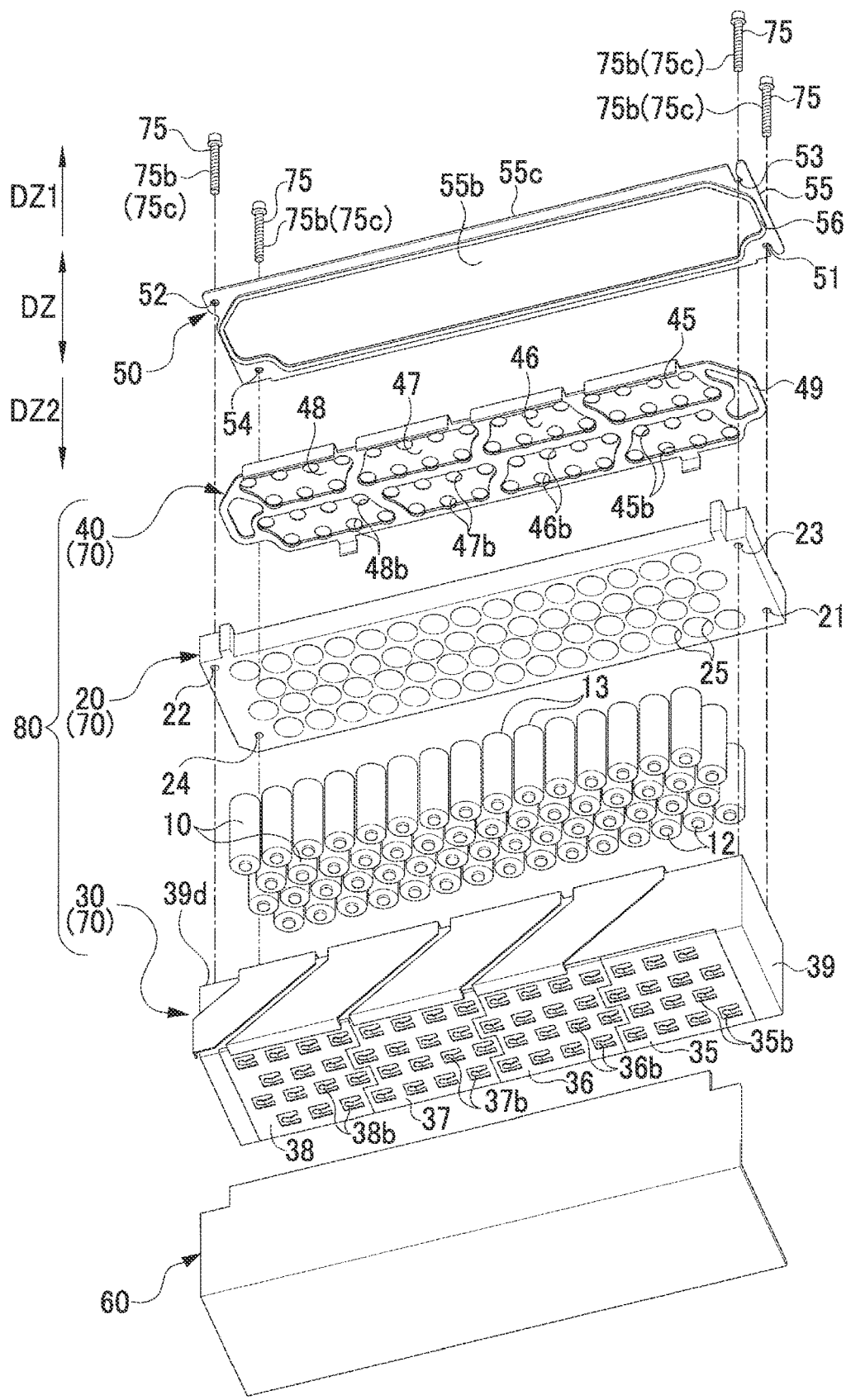
FIG. 3 is an exploded perspective view of the assembled battery.
Figure 4:
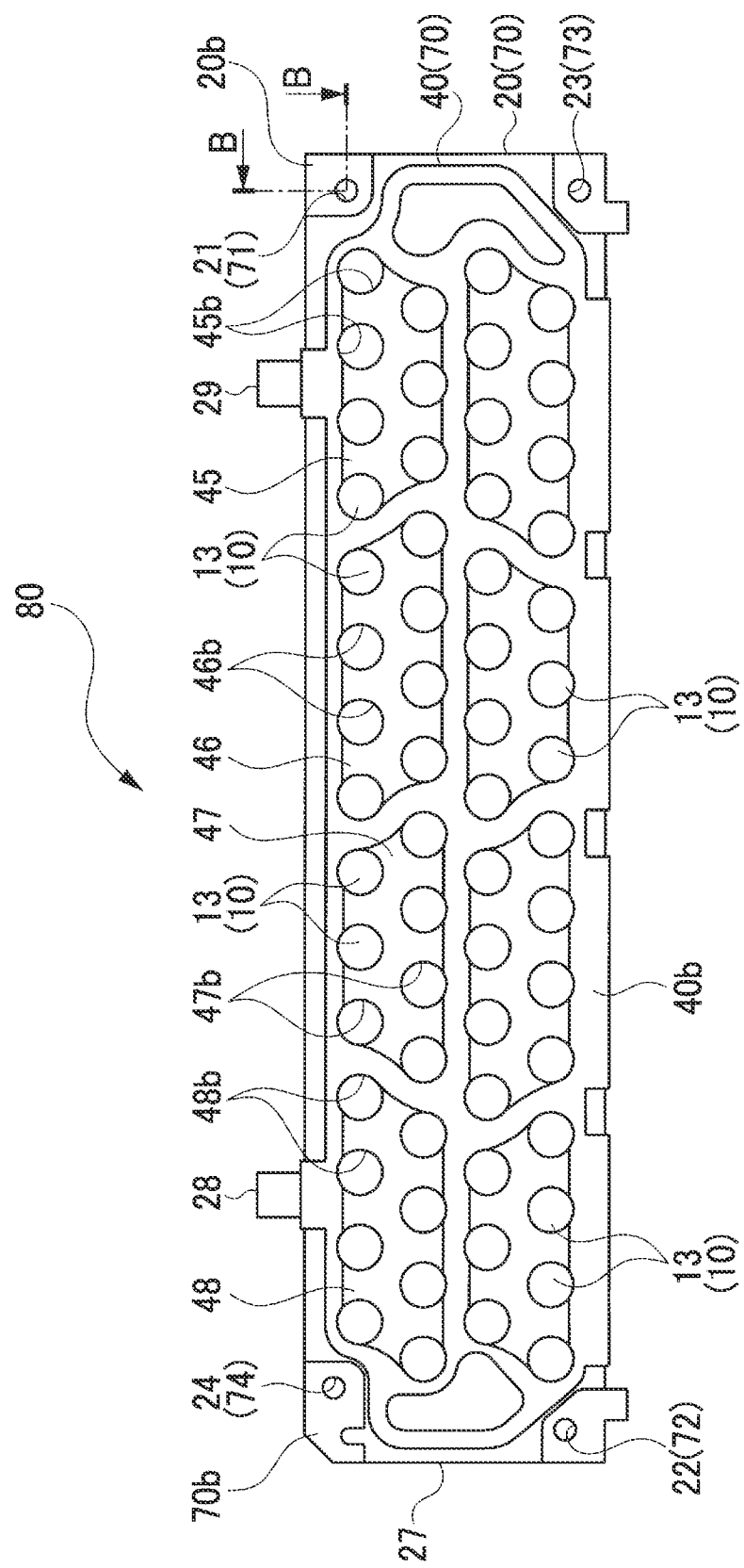
FIG. 4 is a plan view (a top view) of an assembled battery intermediate body.
Figure 5:
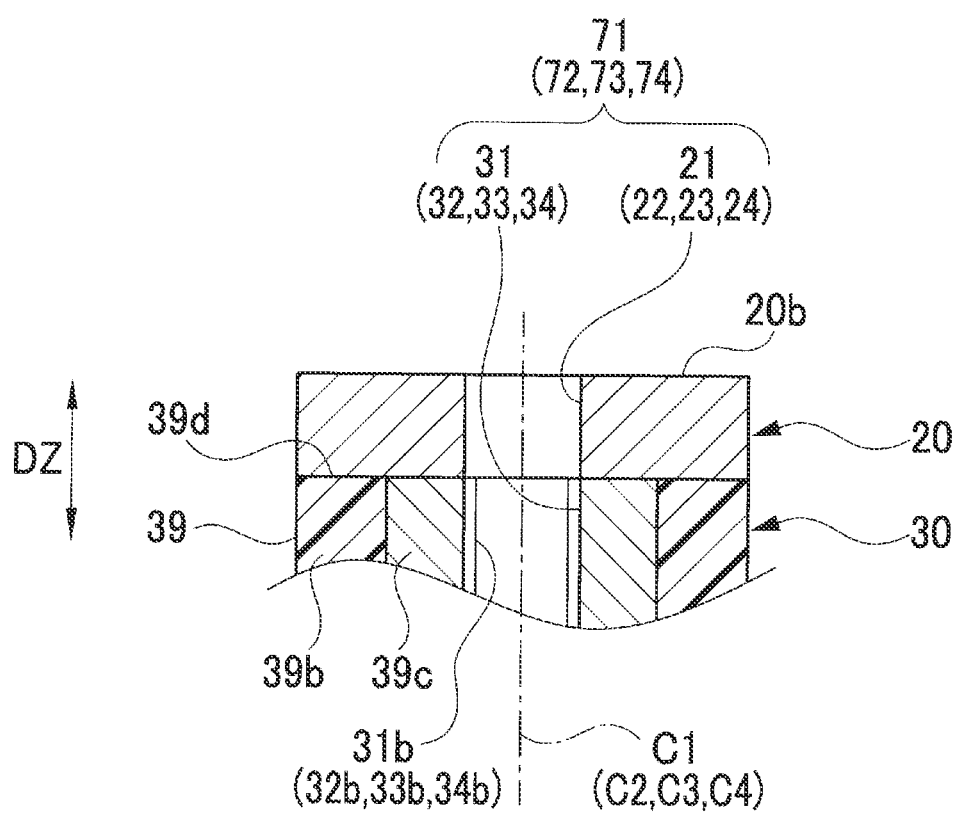
FIG. 5 is a sectional view taken along a line B-B in FIG. 4.

Next will be described an embodiment of the present disclosure with reference to the drawings. FIG. 1 is a perspective view of an assembled battery 1 according to the embodiment. FIG. 2 is a perspective view of a state where a cover 50 is removed from the assembled battery 1. FIG. 3 is an exploded perspective view of the assembled battery 1. FIG. 4 is a plan view (a top view) of an assembled battery intermediate body 80. FIG. 5 is a sectional view taken along a line B-B in FIG. 4 and illustrates fastening holes (a first fastening hole 71, a second fastening hole 72, a third fastening hole 73, and a fourth fastening hole 74) of a storage body 70. Note that, in the present embodiment, the up-down direction in FIGS. 1 to 3 is assumed to be an up-down direction DZ in the assembled battery 1, the assembled battery intermediate body 80, and the storage body 70. Further, the upper direction in FIGS. 1 to 3 is assumed to be an upper direction DZ1 in the assembled battery 1, the assembled battery intermediate body 80, and the storage body 70, and the lower direction in FIGS. 1 to 3 is assumed to be a lower direction DZ2 in the assembled battery 1, the assembled battery intermediate body 80, and the storage body 70.

As illustrated in FIGS. 1 and 2, the assembled battery 1 of the present embodiment includes the assembled battery intermediate body 80, the cover 50, four attachment bolts 75, and a resin cover 60. Among them, the assembled battery intermediate body 80 includes a plurality of cells 10 and a storage body 70 in which the cells 10 are accommodated. As illustrated in FIG. 3, the storage body 70 includes a negative bus bar module 40, a holder 20, and a positive bus bar module 30.

The storage body 70 has a rectangular-solid external appearance and has a first surface 70b (a top face) exposed upward (on the upper side). As illustrated in FIG. 4, the storage body 70 has a rectangular outer shape in a plan view from the first surface 70b side. Note that the first surface 70b is constituted by a peripheral portion of a top face 20b of a holder 20, and a top face 40b of the negative bus bar module 40 (see FIGS. 2 and 4).

As illustrated in FIG. 3, the cell 10 is a cylindrical (pillar-shaped) lithium-ion secondary battery (more specifically, a 18650-type lithium-ion secondary battery). The cell 10 is a single cell and includes a cylindrical cell case, and an electrode body (not shown) and a nonaqueous electrolyte (not shown) accommodated inside the cell case. The electrode body is a wound electrode body formed such that a belt-shaped separator (not shown) is provided between a belt-shaped positive plate (not shown) and a belt-shaped negative plate (not shown), and then wound in a cylindrical manner.

As illustrated in FIG. 3, the holder 20 is made of a metal member (more specifically, aluminum) having a rectangular flat shape and has a plurality of holding holes 25 (the same number as the cells 10) penetrating through the holder 20 in its thickness direction. The holding holes 25 are placed in a hound's tooth check, in a plan view of the holder 20. The cells 10 are fixed to the holder 20 such that the cells 10 are inserted into the holding holes 25 and an adhesive is injected between an outer peripheral surface of each of the cells 10 and an inner peripheral surface of its corresponding holding hole 25 and the adhesive is solidified, so that the outer peripheral surface of the each of the cells 10 is bonded to the inner peripheral surface of the corresponding holding hole 25.

Further, insertion holes 21, 22, 23, 24 through which shaft portions 75b of the attachment bolt 75 are passed are formed at four corners of the holder 20. The insertion holes 21, 22, 23, 24 are holes penetrating through the holder 20 in the thickness direction (a direction along the up-down direction DZ). The insertion holes 21, 22, 23, 24 are opened on the first surface 70b of the storage body 70 (see FIGS. 2 and 4).

The positive bus bar module 30 has a generally rectangular box shape, and includes positive bus bars 35, 36, 37, 38 and a holding portion 39 configured to hold the positive bus bars 35, 36, 37, 38 in an electrically insulated manner. Respective parts (parts projecting from the holder 20 in the lower direction DZ2), on the positive terminal 12 side, of the cells 10 fixed to the holder 20 are inserted into the positive bus bar module 30. A plurality of connecting portions 35b, 36b, 37b, 38b is provided in the positive bus bars 35, 36, 37, 38 and the connecting portions 35b, 36b, 37b, 38b are connected to the positive terminals 12 of the cells 10. More specifically, the connecting portions 35b, 36b, 37b, 38b are joined to the positive terminals 12 of the cells 10 by resistance welding, for example.

Further, four corners, on a top face 39d side, of the holding portion 39 in the positive bus bar module 30 have screw holes 31, 32, 33, 34 having female screws 31b, 32b, 33b, 34b fitting male screws 75c of the attachment bolts 75 (see FIG. 5). The screw holes 31, 32, 33, 34 are screw holes extending in the up-down direction DZ and are opened on the top face 39d of the holding portion 39. The screw holes 31, 32, 33, 34 are placed coaxially with the insertion holes 21, 22, 23, 24 of the holder 20 placed on the top face 39d of the holding portion 39 (so as to have the same central axes C1, C2, C3, C4) in the storage body 70 (see FIG. 5). Note that the holding portion 39 has a holding-portion body portion 39b made of resin and four screw portions 39c made of metal. The screw hole 31, the screw hole 32, the screw hole 33, or the screw hole 34 is formed in its corresponding screw portion 39c.

Accordingly, in the storage body 70 of the present embodiment, the "first fastening hole 71 including the female screw 31b fitting the male screw 75c formed in the shaft portion 75b of the attachment bolt 75, extending in the up-down direction DZ, and opened on the first surface 70b of the storage body 70" is constituted by the insertion hole 21 and the screw hole 31. More specifically, the first fastening hole 71 is formed so that the insertion hole 21 and the screw hole 31 are continuously aligned in a direction (the direction along the up-down direction DZ) where the central axis C1 of the first fastening hole 71 extends (see FIG. 5).

Further, in the storage body 70 of the present embodiment, the "second fastening hole 72 including the female screw 32b fitting the male screw 75c formed in the shaft portion 75b of the attachment bolt 75, extending in the up-down direction DZ, and opened on the first surface 70b of the storage body 70" is constituted by the insertion hole 22 and the screw hole 32. More specifically, the second fastening hole 72 is formed so that the insertion hole 22 and the screw hole 32 are continuously aligned in a direction (the direction along the up-down direction DZ) where the central axis C2 of the second fastening hole 72 extends (see FIG. 5).

Further, in the storage body 70 of the present embodiment, the "third fastening hole 73 including the female screw 33b fitting the male screw 75c formed in the shaft portion 75b of the attachment bolt 75, extending in the up-down direction DZ, and opened on the first surface 70b of the storage body 70" is constituted by the insertion hole 23 and the screw hole 33. More specifically, the third fastening hole 73 is formed so that the insertion hole 23 and the screw hole 33 are continuously aligned in a direction (the direction along the up-down direction DZ) where the central axis C3 of the third fastening hole 73 extends (see FIG. 5).

Further, in the storage body 70 of the present embodiment, the "fourth fastening hole 74 including the female screw 34b fitting the male screw 75c formed in the shaft portion 75b of the attachment bolt 75, extending in the up-down direction DZ, and opened on the first surface 70b of the storage body 70" is constituted by the insertion hole 24 and the screw hole 34. More specifically, the fourth fastening hole 74 is formed so that the insertion hole 24 and the screw hole 34 are continuously aligned in a direction (the direction along the up-down direction DZ) where the central axis C4 of the fourth fastening hole 74 extends (see FIG. 5).

Note that the first fastening hole 71, the second fastening hole 72, the third fastening hole 73, and the fourth fastening hole 74 are holes into which the attachment bolts 75 are inserted and holes used to attach the cover 50 to the assembled battery intermediate body 80 (the storage body 70) by the attachment bolts 75. The first fastening hole 71, the second fastening hole 72, the third fastening hole 73, and the fourth fastening hole 74 are positioned at four corners (parts adjacent to four corners) of the storage body 70 in a plan view of the storage body 70 viewed from the first surface 70b side (see FIGS. 2 and 4).

The negative bus bar module 40 includes negative bus bars 45, 46, 47, 48 and a holding portion 49 configured to hold the negative bus bars 45, 46, 47, 48 in an electrically insulated manner. The negative bus bars 45, 46, 47, 48 have a plurality of circular through-holes 45b, 46b, 47b, 48b. The negative bus bar module 40 is placed in a fixed manner on the top face 20b of the holder 20 fixing the cells 10 (see FIGS. 2 and 4). Respective negative terminals 13 of the cells 10 fixed to the holder 20 are exposed upward (on the upper side) through the through-holes 45b, 46b, 47b, 48b of the negative bus bars 45, 46, 47, 48. Hereby, the negative terminals 13 of the cells 10 are connected to the negative bus bars 45, 46, 47, 48 by ribbon bonding (not shown) via the through-holes 45b, 46b, 47b, 48b.

The cover 50 is a plate-shaped member placed at a predetermined placement position (the position of the cover 50 in FIG. 1 and FIGS. 11 to 14) on the first surface 70b of the storage body 70 so as to cover the first surface 70b side of the storage body 70. As illustrated in FIG. 3, the cover 50 includes a plate-shaped cover body portion 55, and an annular sealing member 56 provided over a whole peripheral portion of a bottom face 55b of the cover body portion 55. Note that, in FIGS. 1 to 3, the cover body portion 55 is illustrated in a flat shape, but actually, the cover body portion 55 has an uneven plate shape obtained by molding a flat plate into an uneven plate shape by press working. Further, the cover body portion 55 is a magnetic body (made of a zinc plating steel sheet that is a magnetic body, for example).

Further, the cover 50 (the cover body portion 55) has a rectangular shape in a plan view and includes four bolt insertion portions (a first bolt insertion portion 51, a second bolt insertion portion 52, a third bolt insertion portion 53, and a fourth bolt insertion portion 54) constituted by through-holes or notch portions placed at four corners 50b, 50c, 50d, 50e (parts adjacent to four corners) of the cover 50 (the cover body portion 55) (see FIGS. 1 to 3).

Among them, the first bolt insertion portion 51 and the third bolt insertion portion 53 are notch portions through which the shaft portions 75b of the attachment bolts 75 can pass (a shape obtained by partially cutting a peripheral portion of a circular hole in its circumferential direction). Further, the second bolt insertion portion 52 and the fourth bolt insertion portion 54 are circular (cylindrical) through-holes through which the shaft portions 75b of the attachment bolts 75 can pass (see FIGS. 1 to 3).

Note that, when the cover 50 is viewed planarly, the first bolt insertion portion 51 and the second bolt insertion portion 52 have a positional relationship in which the first bolt insertion portion 51 and the second bolt insertion portion 52 are placed at two corners 50b, 50c (respective parts adjacent to two corners facing each other) placed on a first diagonal line L1 of the cover 50 (the cover body portion 55) (that is, the first diagonal line L1 passes through the two corners 50b, 50c, in other words, the two corners 50b, 50c are connected by the first diagonal line L1) (see FIG. 2). Further, when the cover 50 is viewed planarly, the third bolt insertion portion 53 and the fourth bolt insertion portion 54 have a positional relationship in which the third bolt insertion portion 53 and the fourth bolt insertion portion 54 are placed at two corners 50d, 50e (respective parts adjacent to the other two corners facing each other) placed on a second diagonal line L2 of the cover 50 (the cover body portion 55) (that is, the second diagonal line L2 passes through the two corners 50d, 50e, in other words, the two corners 50d, 50e are connected by the second diagonal line L2) (see FIG. 2).

The four bolt insertion portions (the first bolt insertion portion 51, the second bolt insertion portion 52, the third bolt insertion portion 53, and the fourth bolt insertion portion 54) are formed at positions facing four fastening holes (the first fastening hole 71, the second fastening hole 72, the third fastening hole 73, and the fourth fastening hole 74) of the storage body 70, respectively, when the cover 50 is placed at the placement position (the position of the cover 50 in FIG. 1 and FIGS. 11 to 14) on the first surface 70b of the storage body 70.

In the assembled battery 1 having the above configuration, respective shaft portions 75b of four attachment bolts 75 are passed through the four bolt insertion portions (the first bolt insertion portion 51, the second bolt insertion portion 52, the third bolt insertion portion 53, and the fourth bolt insertion portion 54) of the cover 50 placed at the placement position, and the cover 50 is fixed to the assembled battery intermediate body 80 in a state where respective male screws 75c of the four attachment bolts 75 are engaged threadedly with the female screws 31b, 32b, 33b, 34b of the four fastening holes (the first fastening hole 71, the second fastening hole 72, the third fastening hole 73, and the fourth fastening hole 74).

Figure 6:
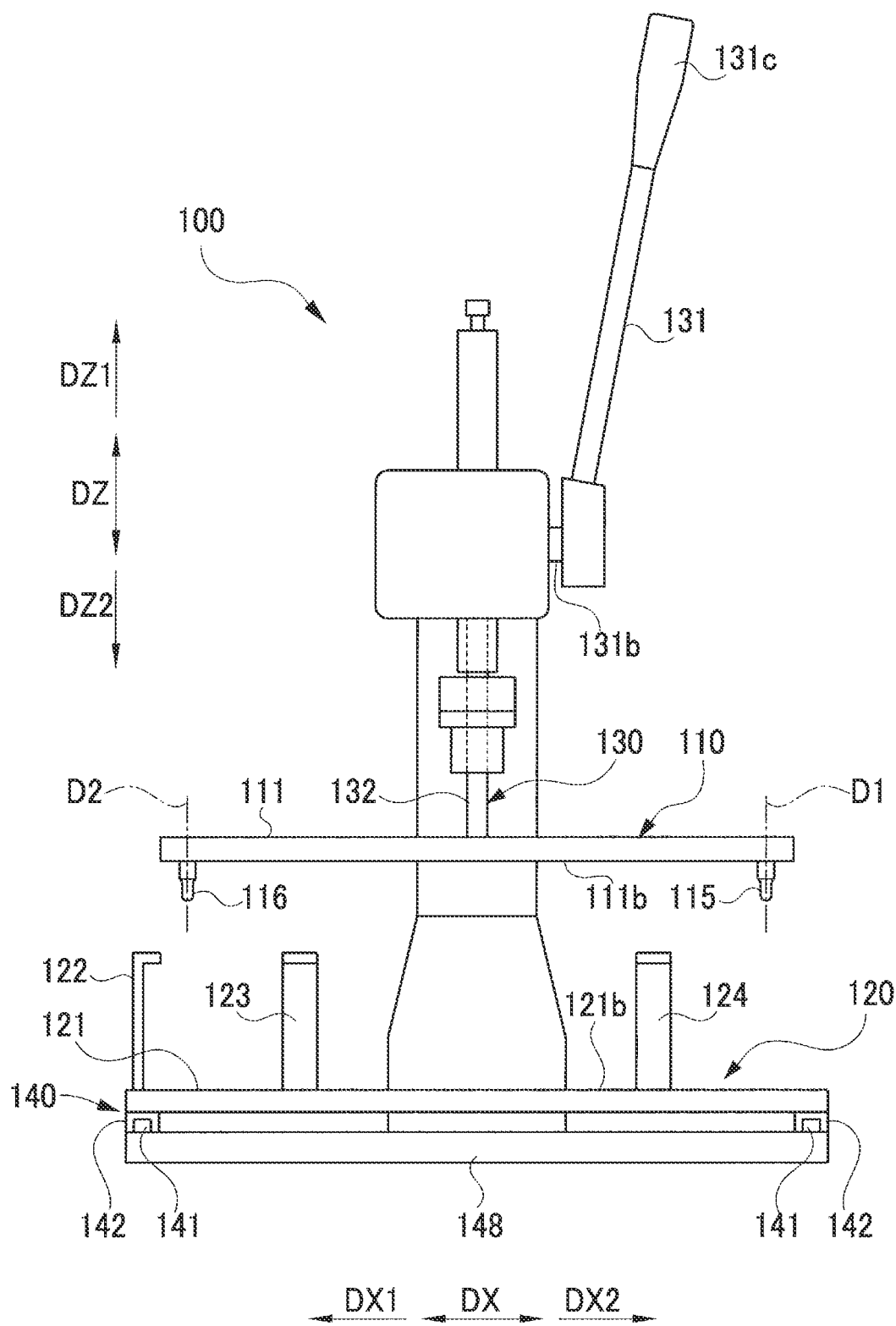
FIG. 6 is a front schematic view of a placement device according to the embodiment.
Figure 7:
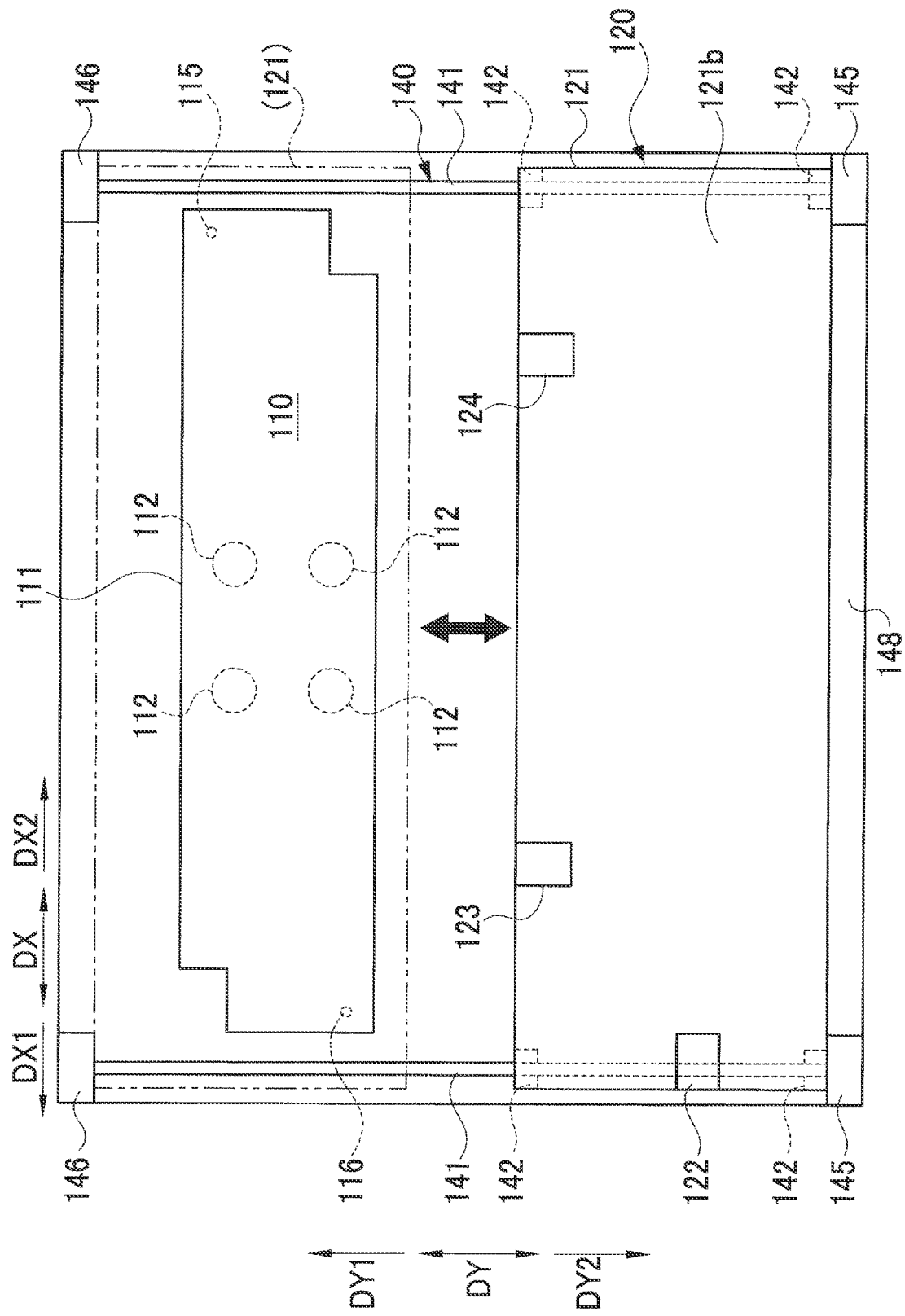
FIG. 7 is an explanatory view of the placement device.

Descriptions are now made of a manufacturing method of the assembled battery according to the embodiment. FIG. 6 is a front schematic view of a placement device 100 according to the embodiment. FIG. 7 is a view to describe a structure of the placement device 100 and corresponds to a schematic plan view of the placement device 100 (a schematic view of the placement device 100 viewed from above). FIGS. 8 to 15 are views to describe the manufacturing method of the assembled battery according to the embodiment. Note that, in FIGS. 7, 8, 9, 12, 14, a placement jig moving mechanism 130 (described later) in the placement device 100 is not illustrated.

First, the following describes the placement device 100. The placement device 100 is a device configured to place the cover 50 at a predetermined placement position on the first surface 70b of the storage body 70 of the assembled battery intermediate body 80 so that the cover 50 is attached to the assembled battery intermediate body 80 (the storage body 70) with the attachment bolts 75.

The placement device 100 includes a placement jig 110, a workpiece table 120, the placement jig moving mechanism 130 configured to move the placement jig 110 in the up-down direction DZ (the up-down direction in FIG. 6, a direction perpendicular to the plane of paper in FIG. 7), and a pedestal moving mechanism 140 configured to move the workpiece table 120 in the front-rear direction DY (a direction perpendicular to the plane of paper in FIG. 6, the up-down direction in FIG. 7).

Among them, the placement jig 110 is a jig configured to place the cover 50 at the placement position in the storage body 70 of the assembled battery intermediate body 80. The placement jig 110 includes a jig body portion 111 having a flat-plate shape, and two positioning pins (a first positioning pin 115 and a second positioning pin 116) extending straight in an axis direction (the direction along the up-down direction DZ) so as to project into the lower direction DZ2 from a bottom face 111b of the jig body portion 111 (see FIGS. 6 and 7). Note that four magnets 112 (indicated as broken-line circles in FIG. 7) are provided in a central part of the bottom face 111b of the jig body portion 111 (see FIG. 7).

In the placement jig 110, the first positioning pin 115 has a shape that allows the first positioning pin 115 to pass through the first bolt insertion portion 51 of the cover 50, and the second positioning pin 116 has a shape that allows the second positioning pin 116 to pass through the second bolt insertion portion 52 of the cover 50. Accordingly, when the cover 50 is attached to the placement jig 110, the first positioning pin 115 passes through the first bolt insertion portion 51 of the cover 50 and the second positioning pin 116 passes through the second bolt insertion portion 52 of the cover 50, so that the cover 50 is positioned with respect to the placement jig 110.

Note that, in the present embodiment, the cover 50 is attached (fixed) to the placement jig 110 such that the first positioning pin 115 is passed through the first bolt insertion portion 51 of the cover 50 and the second positioning pin 116 is passed through the second bolt insertion portion 52 of the cover 50, and further, the cover body portion 55 is connected, by magnetic force, to the magnets 112 provided on the bottom face 111b of the jig body portion 111 of the placement jig 110, so that a surface of the cover 50 (a top face 55c of the cover body portion 55) is brought into contact with the bottom face 111b of the jig body portion 111.

Figure 8:
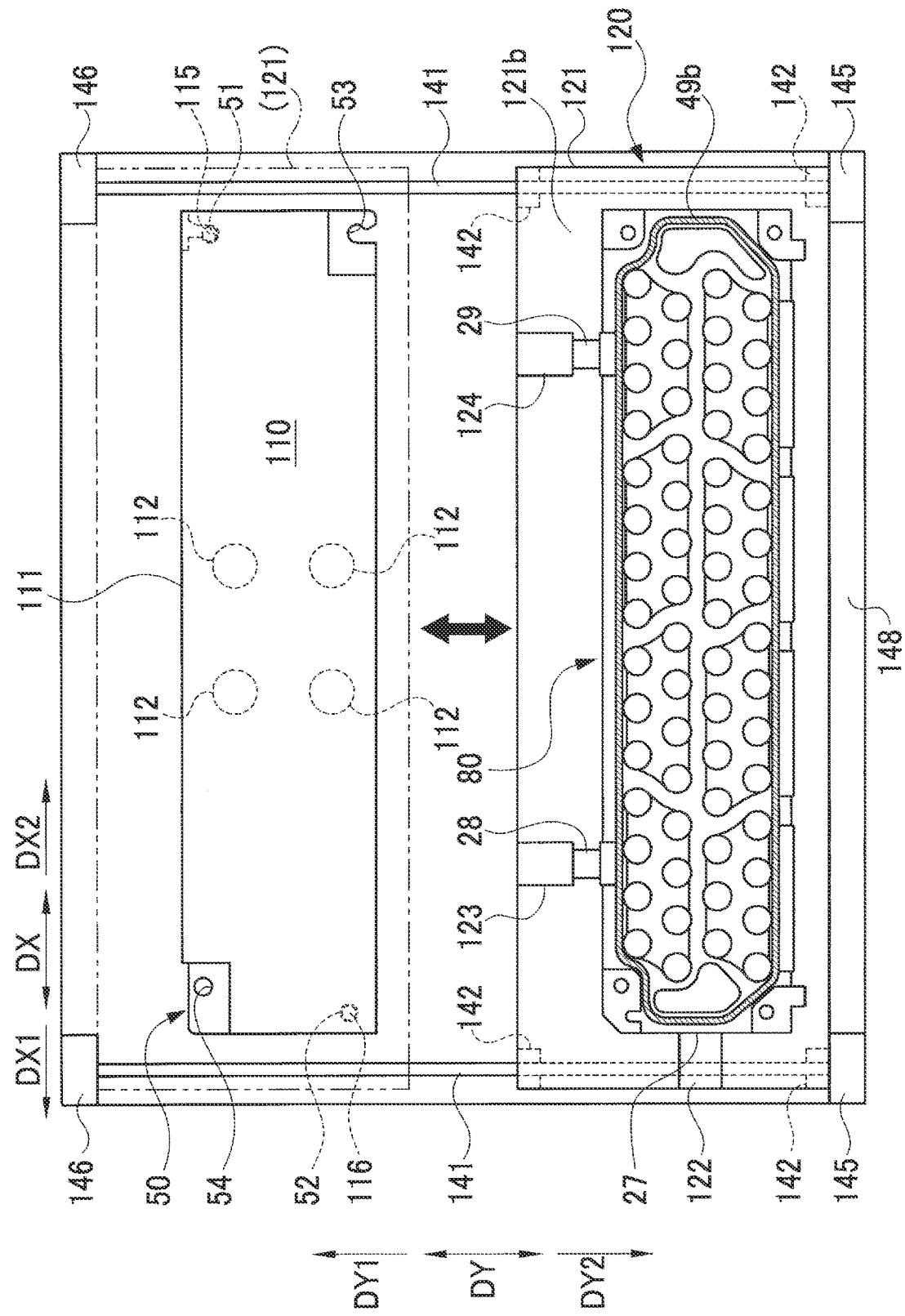
FIG. 8 is a view to describe a manufacturing method of an assembled battery according to the embodiment.

Further, as illustrated in FIGS. 7 and 8, the jig body portion 111 has a rectangular shape with two chamfered corners so that, when the cover 50 is attached to the placement jig 110 as described above, the third bolt insertion portion 53 and the fourth bolt insertion portion 54 of the cover 50 are exposed above the placement jig 110 from the jig body portion 111 without being covered with the jig body portion 111.

Further, the workpiece table 120 includes a rectangular flat-shaped pedestal 121, and positioning portions 122, 123, 124 provided on a top face of the pedestal 121 in a standing manner (see FIGS. 6 and 7). Among them, the pedestal 121 is a pedestal configured such that the assembled battery intermediate body 80 is put on a top face 121b of the pedestal 121. Further, the positioning portion 122 is a part configured to determine a position, in the right-left direction DX, of the assembled battery intermediate body 80 by making contact with an alignment portion 27 of the holder 20 of the assembled battery intermediate body 80 put on the pedestal 121 (see FIG. 8). Further, the positioning portions 123, 124 are parts configured to determine a position, in the front-rear direction DY, of the assembled battery intermediate body 80 by making contact with alignment portions 28, 29 of the holder 20 of the assembled battery intermediate body 80 put on the pedestal 121.

Further, three toggle clamps (not shown) are provided on the top face of the pedestal 121 in a standing manner. One of the toggle clamps is provided at a position facing the positioning portion 122 in the right-left direction DX in a part positioned in the right end (the end in a right direction DX2) of the top face 121b of the pedestal 121 in FIGS. 7 and 8. Further, the other two toggle clamps are provided at positions facing the positioning portions 123, 124 in the front-rear direction DY in parts positioned in the lower end (the end in a front direction DY2) of the top face 121b of the pedestal 121 in FIGS. 7 and 8.

Accordingly, as illustrated in FIG. 8, in terms of the assembled battery intermediate body 80, in a state where the assembled battery intermediate body 80 is put on the pedestal 121 so that the alignment portion 27 of the holder 20 is brought into contact with the positioning portion 122 of the workpiece table 120 and the alignment portions 28, 29 of the holder 20 are brought into contact with the positioning portions 123, 124 of the workpiece table 120, the assembled battery intermediate body 80 is pressed in a left direction DX1 by the one of the toggle clamps (not shown) and the assembled battery intermediate body 80 is pressed in a rear direction DY1 by the other two toggle clamps (not shown). Hereby, the assembled battery intermediate body 80 can be fixed to a predetermined position (a position illustrated in FIG. 8) on the pedestal 121.

Further, the placement jig moving mechanism 130 includes a lever 131 configured to rotationally move around a rotating shaft 131b, and a shaft 132 connected to the lever 131. The placement jig moving mechanism 130 is configured such that the shaft 132 moves in the up-down direction DZ by rotationally moving the lever 131 around the rotating shaft 131b. More specifically, when the lever 131 is rotationally moved so that a handle portion 131c of the lever 131 is moved to the lower direction DZ2, the shaft 132 moves to the lower direction DZ2. Conversely, when the lever 131 is rotationally moved so that the handle portion 131c of the lever 131 moves to the upper direction DZ1, the shaft 132 moves to the upper direction DZ1.

Note that, as illustrated in FIG. 6, the placement jig 110 is fixed to a lower end of the shaft 132. Accordingly, when the lever 131 is rotationally moved so that the handle portion 131c of the lever 131 is moved to the lower direction DZ2, the placement jig 110 can be moved to the lower direction DZ2. Conversely, when the lever 131 is rotationally moved so that the handle portion 131c of the lever 131 is moved to the upper direction DZ1, the placement jig 110 can be moved to the upper direction DZ1.

Further, the pedestal moving mechanism 140 includes a base 148 having a rectangular flat shape, two rails 141 fixed to right and left ends on the top face of the base 148, four carriages 142 fixed to four corners (four corner parts) on a bottom face of the pedestal 121, and four fixed portions 145, 146 fixed to four corners (four corner parts) on a top face of the base 148.

Among them, the two rails 141 have a shape extending straight in the front-rear direction DY. Further, the carriages 142 fixed to the right end on the bottom face of the pedestal 121 are attached to the rail 141 fixed to the right end on the top face of the base 148. In the meantime, the carriages 142 fixed to the left end on the bottom face of the pedestal 121 are attached to the rail 141 fixed to the left end on the top face of the base 148. Note that the rails 141 and the carriages 142 are members constituting a well-known linear-motion guide. Hereby, the workpiece table 120 including the pedestal 121 can move in the front-rear direction DY along the two rails 141.

Note that the fixed portions 145 fixed to an end, in the front direction DY2, of the top face of the base 148 are members configured to restrict (prevent) movement of the workpiece table 120 including the pedestal 121 to the front direction DY2, by making contact with an end (an end surface), in the front direction DY2, of the pedestal 121. Further, the fixed portions 146 fixed to an end, in the rear direction DY1, of the top face of the base 148 are members configured to restrict (prevent) movement of the workpiece table 120 including the pedestal 121 to the rear direction DY1 by making contact with an end (an end surface), in the rear direction DY1, of the pedestal 121.

Figure 9:
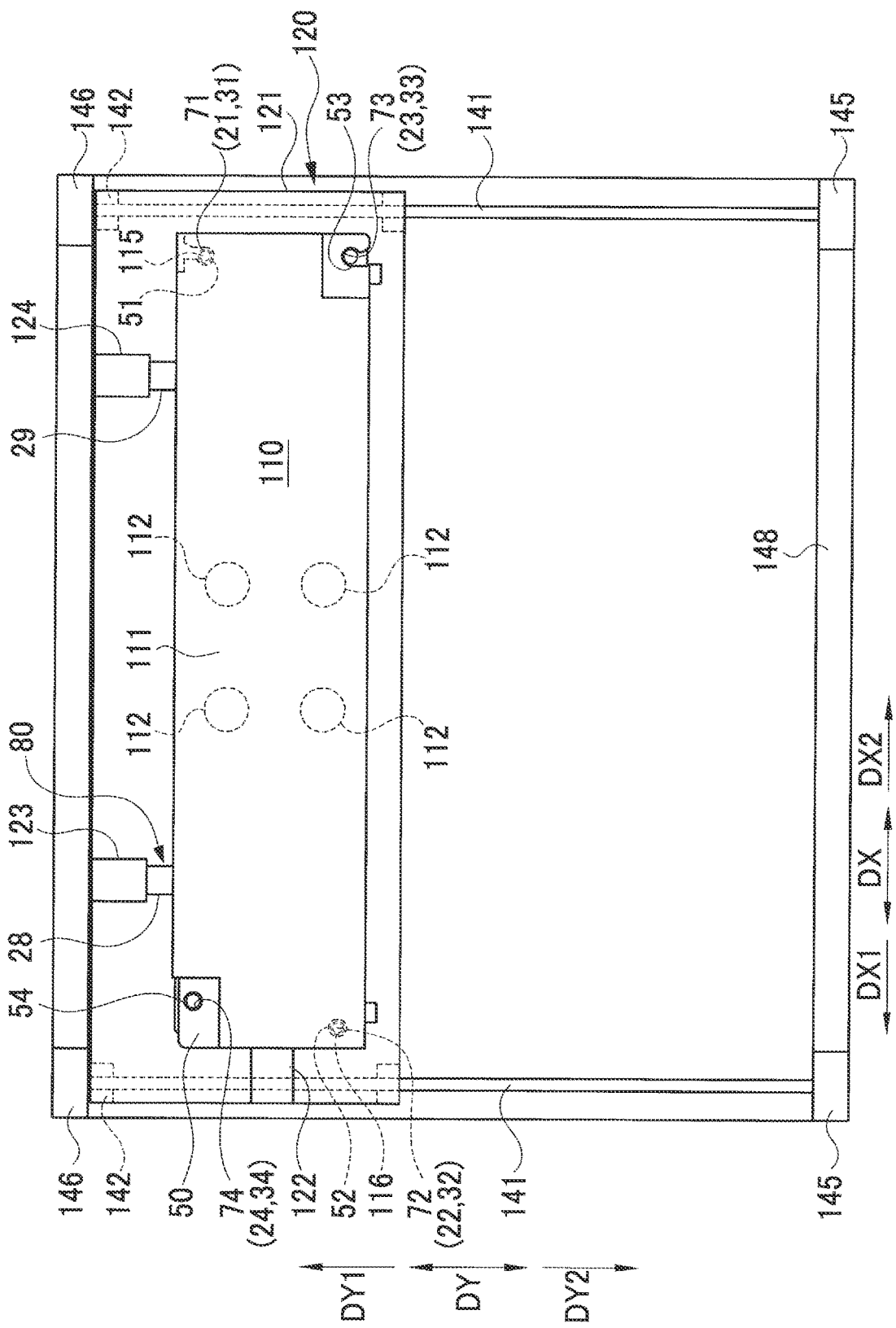
FIG. 9 is another view to describe the manufacturing method of the assembled battery according to the embodiment.

Here, a position (a position illustrated in FIG. 9) of the pedestal 121 in a state where the end (end surface), in the rear direction DY1, of the pedestal 121 makes contact with the fixed portions 146 is referred to as a first position. The first position is a position where the pedestal 121 in a state where the assembled battery intermediate body 80 is fixed to the top face 121b is placed right under the placement jig 110. As illustrated in FIG. 9, the placement device 100 is configured such that the assembled battery intermediate body 80 (the storage body 70) is placed right under the placement jig 110 at the time when the pedestal 121 in the state where the assembled battery intermediate body 80 is fixed to the top face 121*b* of the pedestal 121 is placed at the first position (the position illustrated in FIG. 9) by use of the pedestal moving mechanism 140.

Further, at the time when the pedestal 121 in the state where the assembled battery intermediate body 80 is fixed to the top face 121*b* of the pedestal 121 is placed at the first position (the position illustrated in FIG. 9), the first positioning pin 115 of the placement jig 110 and the first fastening hole 71 of the storage body 70 face each other in the axis direction of the first positioning pin 115 (a direction along an axis D1, the direction along the up-down direction DZ) and the second positioning pin 116 of the placement jig 110 and the second fastening hole 72 of the storage body 70 face each other in the axis direction of the second positioning pin 116 (a direction along an axis D2, the direction along the up-down direction DZ).

Further, at this time, as illustrated in FIG. 9, the third bolt insertion portion 53 of the cover 50 and the third fastening hole 73 (the insertion hole 23 and the screw hole 33) of the storage body 70 face each other in the up-down direction DZ (a direction perpendicular to the plane of paper in FIG. 9), and the fourth bolt insertion portion 54 of the cover 50 and the fourth fastening hole 74 (the insertion hole 24 and the screw hole 34) of the storage body 70 face each other in the up-down direction DZ.

Figure 16:
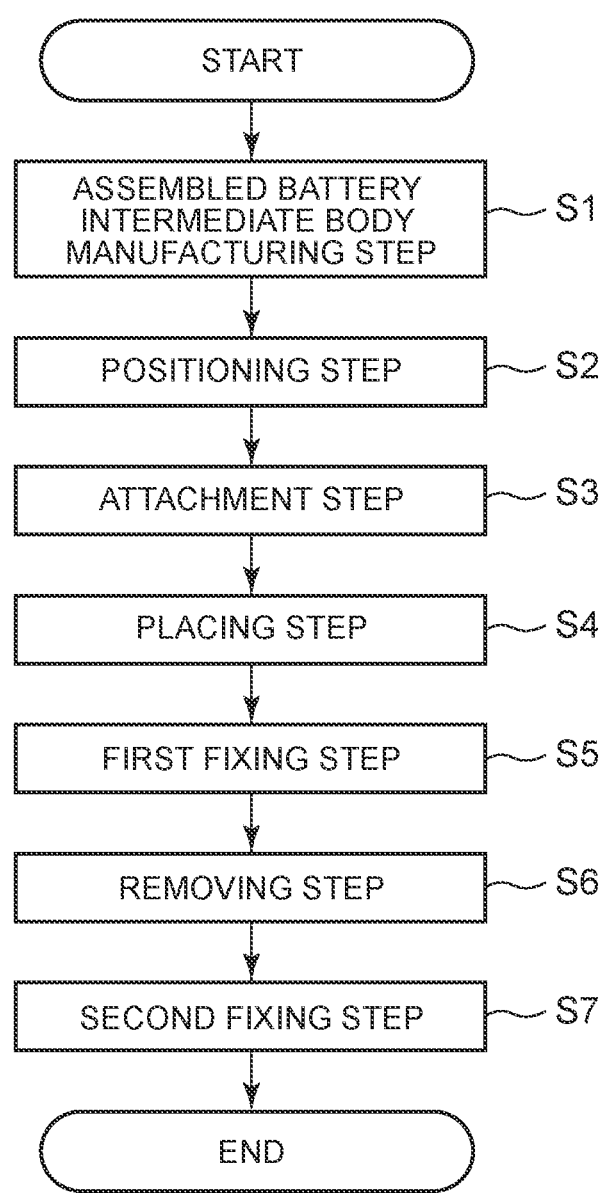
FIG. 16 is a flowchart illustrating the flow of the manufacturing method of the assembled battery according to the embodiment.

Descriptions are now made of the manufacturing method of the assembled battery 1. FIG. 16 is a flowchart illustrating the flow of the manufacturing method of the assembled battery according to the present embodiment. First, in step S1 (an assembled battery intermediate body manufacturing step), the assembled battery intermediate body 80 is manufactured. More specifically, the cells 10, the holder 20, the positive bus bar module 30, and the negative bus bar module 40 are prepared first. Subsequently, the cells 10 are inserted into the holding holes 25 of the holder 20, and then, the holder 20 and the positive bus bar module 30 are assembled. Subsequently, an adhesive is injected between the outer peripheral surfaces of the cells 10 and the inner peripheral surfaces of the holding holes 25 and solidified. Hereby, the cells 10 are fixed to the holder 20 in a state where the outer peripheral surfaces of the cells 10 are bonded to the inner peripheral surfaces of the holding holes 25.

Then, the negative bus bar module 40 is placed on the top face 20*b* of the holder 20 and is fixed thereto. After that, the negative terminals 13 of the cells 10 fixed to the holder 20 are connected to the negative bus bars 45, 46, 47, 48 by ribbon bonding (not shown). Further, the connecting portions 35*b*, 36*b*, 37*b*, 38*b* included in the positive bus bars 35, 36, 37, 38 are connected to the positive terminals 12 of the cells 10 by resistance welding. Hereby, the storage body 70 is constituted by the negative bus bar module 40, the holder 20, and the positive bus bar module 30, and thus, the assembled battery intermediate body 80 including the storage body 70 and the cells 10 is manufactured.

Then, the process proceeds to step S2 (a positioning step) in which the assembled battery intermediate body 80 is positioned at the predetermined position (the position illustrated in FIG. 8) on the pedestal 121 of the placement device 100 in a posture where the first surface 70*b* of the storage body 70 faces the upper direction DZ1. More specifically, the workpiece table 120 is fixed first in a state where the end (end surface), in the front direction DY2, of the pedestal 121 is brought into contact with the fixed portions 145 provided on the top face of the base 148. Note that a position (the position illustrated in FIG. 8) of the pedestal 121 in the state where the end (end surface), in the front direction DY2, of the pedestal 121 makes contact with the fixed portions 145 is referred to as a second position. As illustrated in FIG. 8, the placement jig 110 is not placed right above the workpiece table 120 (the pedestal 121) placed at the second position.

Subsequently, in terms of the assembled battery intermediate body 80, the assembled battery intermediate body 80 is put on the pedestal 121 so that the alignment portion 27 of the holder 20 is brought into contact with the positioning portion 122 of the workpiece table 120 and the alignment portions 28, 29 of the holder 20 are brought into contact with the positioning portions 123, 124 of the workpiece table 120 (see FIG. 8). In this state, the assembled battery intermediate body 80 is pressed in the left direction DX1 by the toggle clamp (not shown) provided in the end, in the right direction DX2, of the top face 121*b* of the pedestal 121, and the assembled battery intermediate body 80 is pressed in the rear direction DY1 by the toggle clamps (not shown) provided in the end, in the front direction DY2, of the top face 121*b* of the pedestal 121. Hereby, the assembled battery intermediate body 80 is fixed at the predetermined position (the position illustrated in FIG. 8) on the pedestal 121 in the posture where the first surface 70*b* of the storage body 70 faces the upper direction DZ1.

Subsequently, the process proceeds to step S3 (an attachment step) in which the cover 50 is prepared and the cover 50 is attached to the placement jig 110 provided in the placement device 100. More specifically, the cover 50 is attached (fixed) to the placement jig 110 such that the first positioning pin 115 provided in the placement jig 110 is passed through the first bolt insertion portion 51 of the cover 50 and the second positioning pin 116 is passed through the second bolt insertion portion 52 of the cover 50, and further, the top face 55*c* of the cover body portion 55 is connected, by magnetic force, to the magnets 112 provided on the bottom face 111*b* of the jig body portion 111 of the placement jig 110, so that the surface (the top face 55*c* of the cover body portion 55) of the cover 50 is brought into contact with the bottom face 111*b* of the jig body portion 111 (see FIGS. 8 and 10).

In the present embodiment, as described above, the placement jig 110 provided with the magnets 112 (magnets) on the bottom face 111*b* of the jig body portion 111 is used as a placement jig and the cover 50 including the plate-shaped cover body portion 55 made of a magnetic body is used as a cover. Hereby, in step S3 (the attachment step), the cover 50 can be attached to the placement jig 110 just by connecting the cover 50 (the cover body portion 55) to the magnets 112 by magnetic force. Accordingly, in the manufacturing method of the present embodiment, the cover 50 can be easily attached to the placement jig 110.

Note that, as illustrated in FIG. 8, in a state where the cover 50 is attached to the placement jig 110, the third bolt insertion portion 53 and the fourth bolt insertion portion 54 of the cover 50 are exposed above the placement jig 110 from the jig body portion 111 without being covered with the jig body portion 111.

Then, the process proceeds to step S4 (a placing step) in which the placement jig 110 to which the cover 50 is attached is moved downward from above the assembled battery intermediate body 80 fixed to the top face 121*b* of the pedestal 121 in the posture in which the first surface 70*b* of the storage body 70 faces upward, so that the cover 50 is placed at the placement position on the first surface 70b of the storage body 70.

More specifically, first, the workpiece table 120 placed at the second position (the position illustrated in FIG. 8) in the state where the assembled battery intermediate body 80 is fixed to the top face 121b of the pedestal 121 is moved to the rear direction DY1 along the two rails 141 of the pedestal moving mechanism 140, so that the workpiece table 120 is placed at the first position (the position illustrated in FIG. 9). Then, the workpiece table 120 in the state where the assembled battery intermediate body 80 is fixed to the top face 121b of the pedestal 121 is fixed at the first position.

Note that, as illustrated in FIG. 9, when the pedestal 121 is placed at the first position, the assembled battery intermediate body 80 (the storage body 70) fixed to the top face 121b of the pedestal 121 is placed right under the placement jig 110, so that such a positional relationship is established that the first positioning pin 115 of the placement jig 110 and the first fastening hole 71 of the storage body 70 face each other in the axis direction of the first positioning pin 115 (the direction along the axis D1, the direction along the up-down direction DZ) and the second positioning pin 116 of the placement jig 110 and the second fastening hole 72 of the storage body 70 face each other in the axis direction of the second positioning pin 116 (the direction along the axis D2, the direction along the up-down direction DZ).

Further, when the pedestal 121 is placed at the first position, as illustrated in FIG. 9, the third bolt insertion portion 53 of the cover 50 and the third fastening hole 73 (the insertion hole 23 and the screw hole 33) of the storage body 70 face each other in the up-down direction DZ (the direction perpendicular to the plane of paper in FIG. 9), and the fourth bolt insertion portion 54 of the cover 50 and the fourth fastening hole 74 (the insertion hole 24 and the screw hole 34) of the storage body 70 face each other in the up-down direction DZ.

Figure 10:
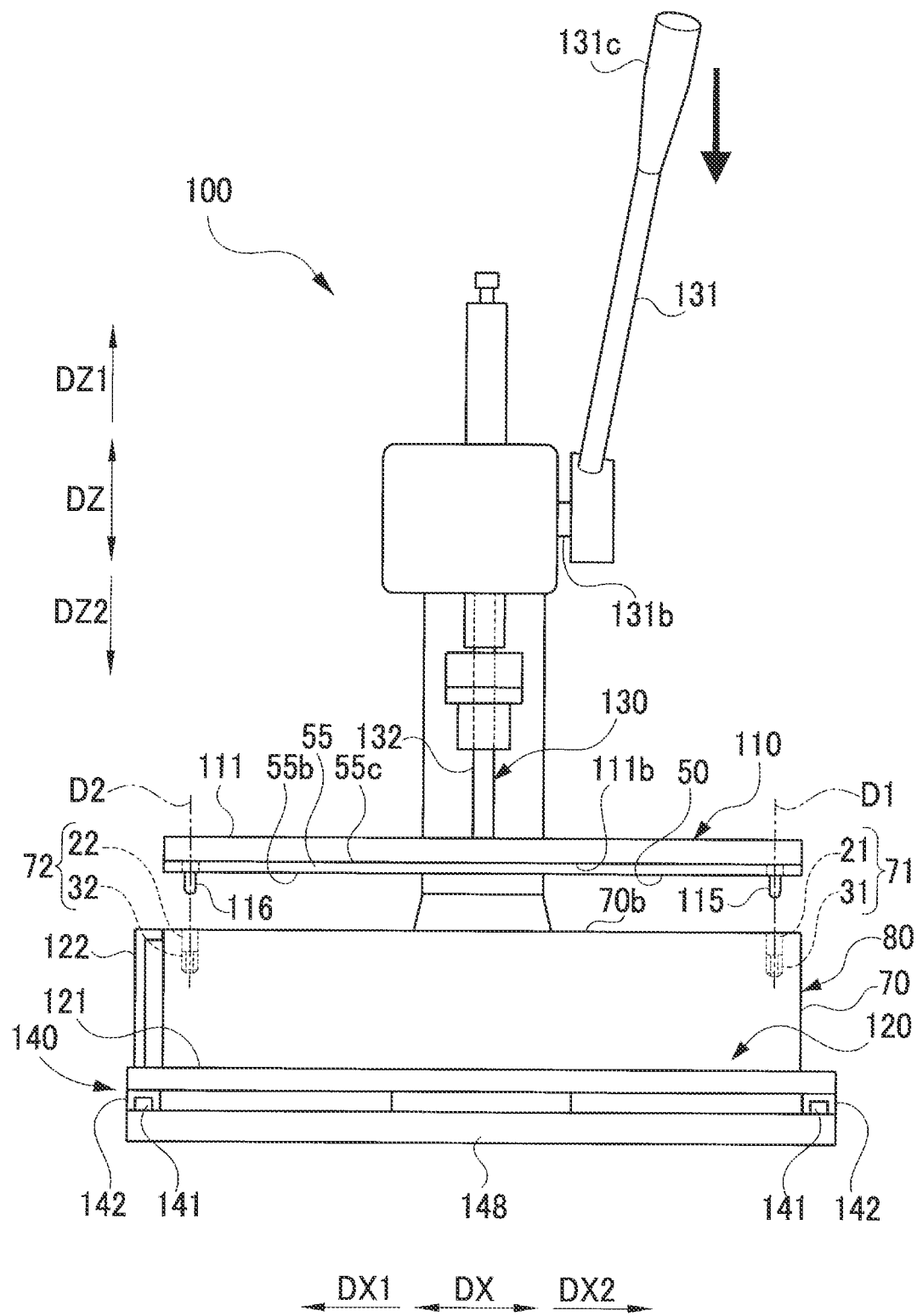
FIG. 10 is another view to describe the manufacturing method of the assembled battery according to the embodiment.

Then, in a state where the workpiece table 120 in which the assembled battery intermediate body 80 is fixed to the top face 121b of the pedestal 121 is fixed at the first position, the placement jig 110 to which the cover 50 is attached is moved downward from above the assembled battery intermediate body 80 by use of the placement jig moving mechanism 130. More specifically, as illustrated in FIG. 10, the lever 131 is rotationally moved so that the handle portion 131c of the lever 131 placed above is moved to the lower direction DZ2, so that the placement jig 110 fixed to the lower end of the shaft 132 is moved to the lower direction DZ2.

Figure 11:
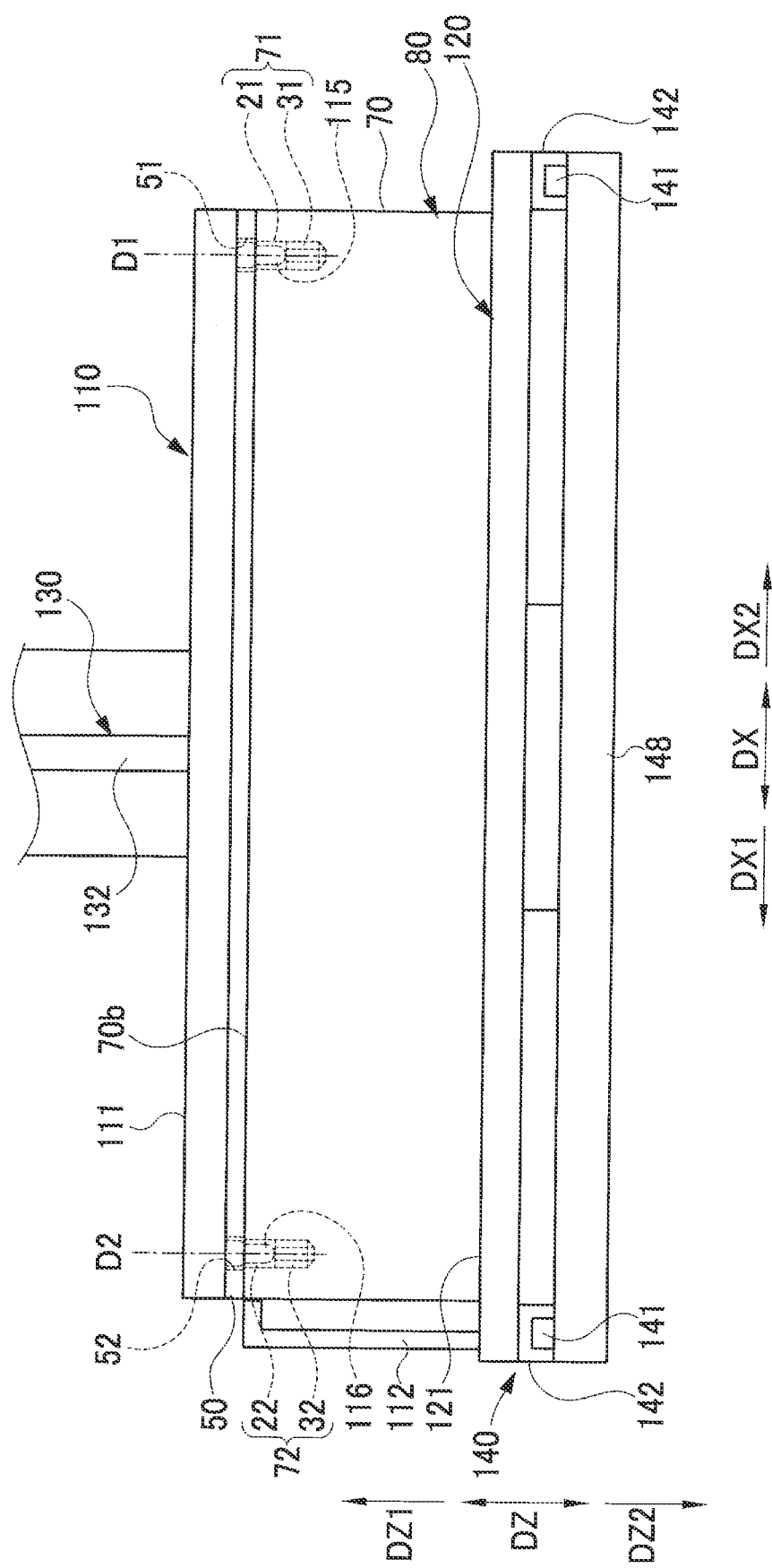
FIG. 11 is another view to describe the manufacturing method of the assembled battery according to the embodiment.

Then, as illustrated in FIG. 11, the first positioning pin 115 of the placement jig 110 to which the cover 50 is attached is inserted into the first fastening hole 71 of the storage body 70 (more specifically, the insertion hole 21 of the holder 20) and the second positioning pin 116 is inserted into the second fastening hole 72 of the storage body 70 (more specifically, the insertion hole 22 of the holder 20), so that the cover 50 is placed at the placement position on the first surface 70b of the storage body 70.

More specifically, first, the first positioning pin 115 of the placement jig 110 to which the cover 50 is attached is inserted into the first fastening hole 71 of the storage body 70 (more specifically, the insertion hole 21 of the holder 20) and the second positioning pin 116 is inserted into the second fastening hole 72 of the storage body 70 (more specifically, the insertion hole 22 of the holder 20), so that the annular sealing member 56 provided on the bottom face 55b of the cover body portion 55 is brought into contact with an annular sealing surface 49b included in the first surface 70b of the storage body 70. Note that the sealing surface 49b is a part of the top face of the holding portion 49 of the negative bus bar module 40 and is an annular part indicated by hatching in FIGS. 4 and 8. The sealing surface 49b is configured to surround all the cells 10 accommodated inside the storage body 70 in a plan view.

Then, in a state where the sealing member 56 of the cover body portion 55 is brought into contact with the sealing surface 49b of the storage body 70, the lever 131 is rotationally moved so that the handle portion 131c of the lever 131 is further moved to the lower direction DZ2. Hereby, a predetermined set load (e.g., 100 N) is applied, via the placement jig 110, to the cover 50 in a direction where the cover 50 approaches the first surface 70b of the storage body 70 (that is, the lower direction DZ2), so that the sealing member 56 is sandwiched and compressed between the cover body portion 55 and the sealing surface 49b of the first surface 70b. Hereby, the sealing member 56 makes close contact with the sealing surface 49b, so that the cover 50 is placed at the predetermined placement position.

Figure 15:
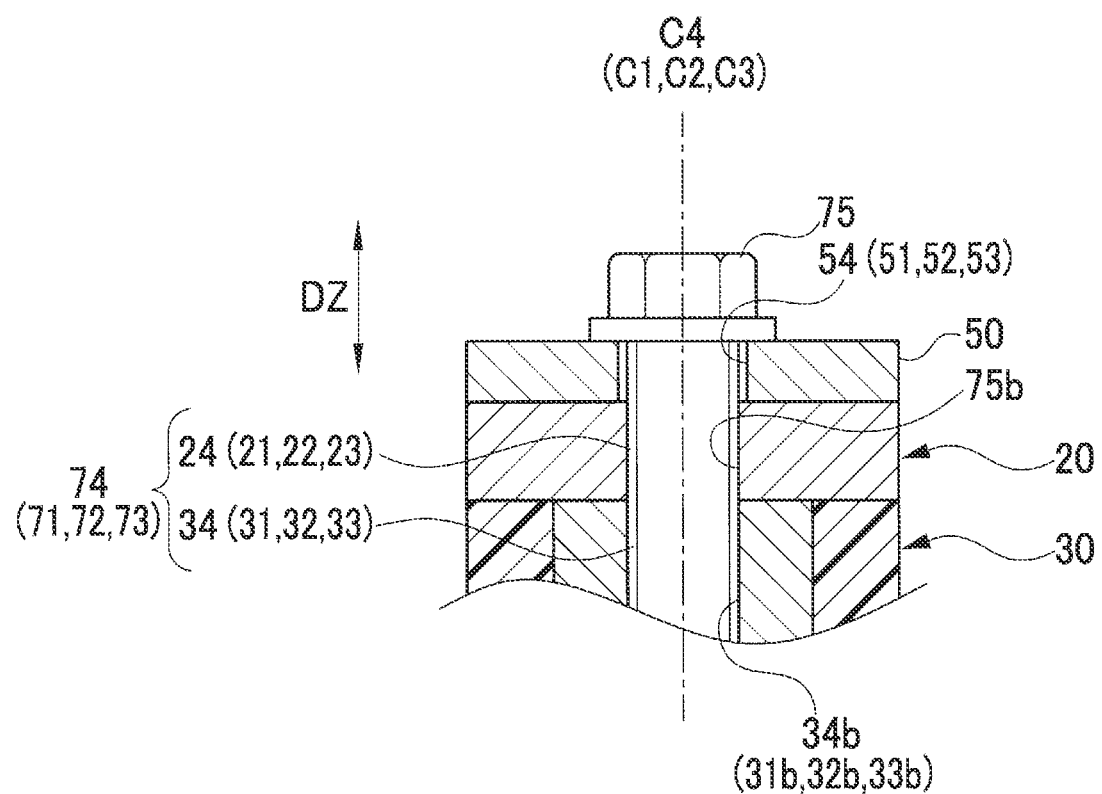
FIG. 15 is another view to describe the manufacturing method of the assembled battery according to the embodiment.

When the cover 50 is placed at the predetermined placement position, the first bolt insertion portion 51 of the cover 50 and the first fastening hole 71 (the insertion hole 21 and the screw hole 31) of the storage body 70 face each other in the up-down direction DZ (are aligned in the up-down direction DZ), the second bolt insertion portion 52 and the second fastening hole 72 (the insertion hole 22 and the screw hole 32) face each other in the up-down direction DZ (are aligned in the up-down direction DZ), the third bolt insertion portion 53 and the third fastening hole 73 (the insertion hole 23 and the screw hole 33) face each other in the up-down direction DZ (are aligned in the up-down direction DZ), and the fourth bolt insertion portion 54 and the fourth fastening hole 74 (the insertion hole 24 and the screw hole 34) face each other in the up-down direction DZ (are aligned in the up-down direction DZ) (see FIG. 15).

As described above, with the manufacturing method of the present embodiment, the cover 50 can be placed at the predetermined placement position on the first surface 70b of the storage body 70 easily and appropriately (with a high positional accuracy).

In the present embodiment, a difference between an outside diameter D11 of a part, of the first positioning pin 115, that is placed inside the first bolt insertion portion 51 of the cover 50 and an inside dimension H11 (an inside diameter) of a part, of the first bolt insertion portion 51, through which the first positioning pin 115 is passed is extremely small and is set to satisfy a relationship of $0.93 < (D11/H11) < 0.99$. Further, a difference between a maximum outside diameter D12 of a part, of the first positioning pin 115, that is placed inside the first fastening hole 71 (more specifically, the insertion hole 21 of the holder 20) and an inside diameter H12 of the insertion hole 21 of the holder 20 is also extremely small and is set to satisfy a relationship of $0.95 < (D12/H12) < 0.99$.

Further, a difference between an outside diameter D21 of a part, of the second positioning pin 116, that is placed inside the second bolt insertion portion 52 of the cover 50 and an inside diameter H21 of a part, of the second bolt insertion portion 52, through which the second positioning pin 116 is passed is extremely small and is set to satisfy a relationship of $0.94 < (D21/H21) < 0.99$. Further, a difference between a maximum outside diameter D22 of a part, of the second positioning pin 116, that is placed inside the second fastening hole 72 (more specifically, the insertion hole 22 of the holder 20) and an inside diameter H22 of the insertion hole 22 of the holder 20 is also extremely small and is set to satisfy a relationship of 0.97<(D22/H22)<1.0.

With such a dimension relationship, positional accuracy of the cover 50 with respect to the placement jig 110 is increased and positional accuracy of the cover 50 with respect to the first surface 70b of the storage body 70 is also increased, so that the cover 50 can be placed at the predetermined placement position on the first surface 70b of the storage body 70 with a high positional accuracy.

Then, the process proceeds to step S5 (a first fixing step) in which, while a predetermined set load (e.g., 100 N) is applied to the cover 50 and a state where the cover 50 is placed at the placement position is maintained, the cover 50 is fixed to the assembled battery intermediate body 80 (the storage body 70) by fastening of two attachment bolts 75. Although not illustrated herein, the placement device 100 is provided with an indicator configured to display a value of a load applied to the cover 50 and information indicating that the value of the load reaches the set load. Accordingly, an operator can check the indicator to find whether the load applied to the cover 50 is the set load (e.g., 100 N) or not.

Figure 12:
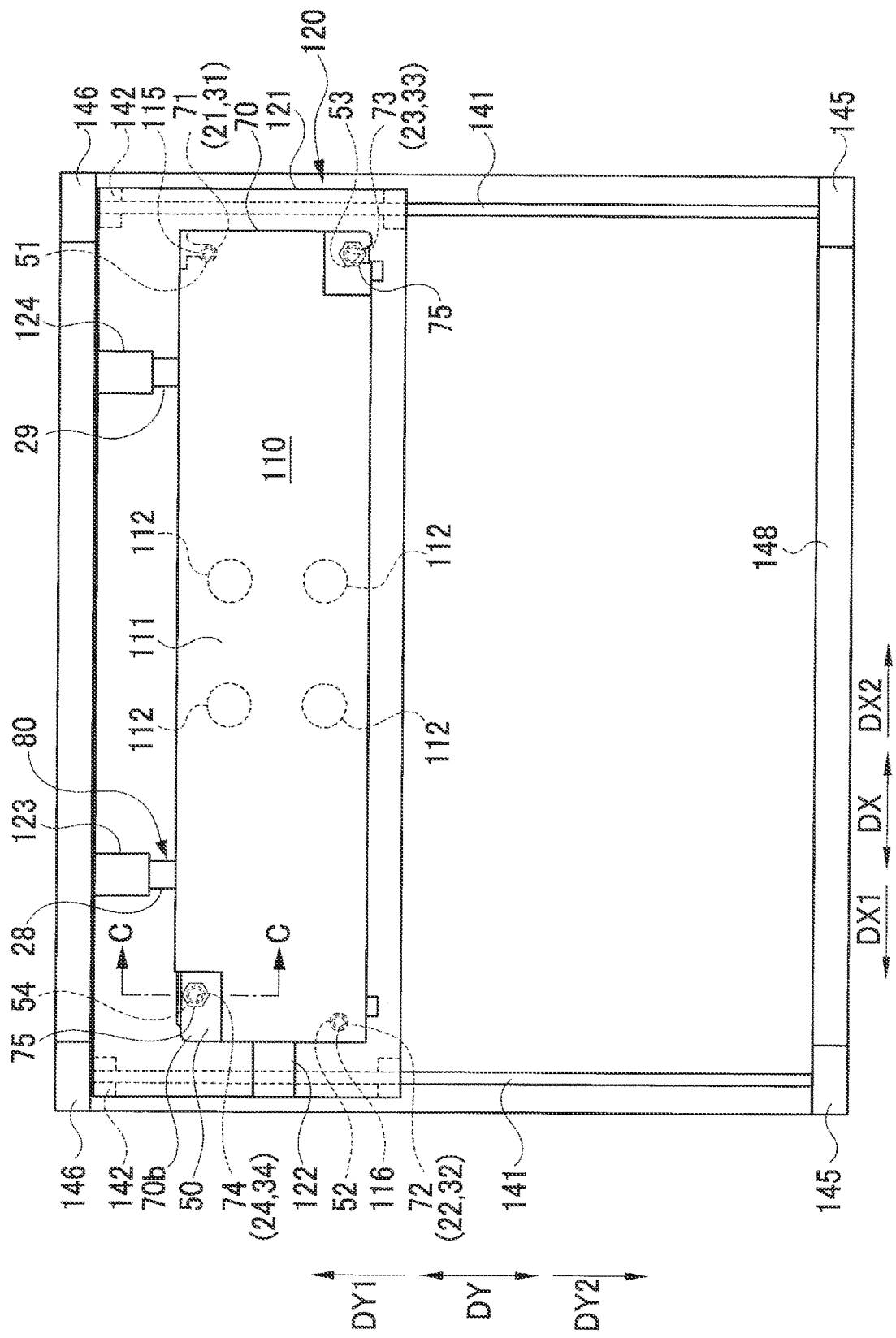
FIG. 12 is another view to describe the manufacturing method of the assembled battery according to the embodiment.

More specifically, as illustrated in FIGS. 12 and 15, first, by use of a nut runner (not shown), the shaft portion 75b of a first one of the two attachment bolts 75 is passed through the third bolt insertion portion 53 of the cover 50 and then passed through the insertion hole 23 of the third fastening hole 73 of the storage body 70, and further, the male screw 75c of the first one of the two attachment bolts 75 is engaged threadedly with the female screw 33b of the screw hole 33 of the third fastening hole 73. Further, the shaft portion 75b of a second one of the two attachment bolts 75 is passed through the fourth bolt insertion portion 54 of the cover 50 and then passed through the insertion hole 24 of the fourth fastening hole 74 of the storage body 70, and further, the male screw 75c of the second one of the two attachment bolts 75 is engaged threadedly with the female screw 34b of the screw hole 34 of the fourth fastening hole 74. Note that FIG. 15 is a sectional view of a C-C part in FIG. 12.

Hereby, while the state where the sealing member 56 makes close contact with the sealing surface 49b via the placement jig 110 to which the cover 50 is attached is maintained, the cover 50 can be fastened and fixed to the assembled battery intermediate body with two attachment bolts 75 by use of the nut runner (not shown).

As such, in the present embodiment, in step S4 (the placing step), the first positioning pin 115 and the second positioning pin 116 of the placement jig 110 to which the cover 50 is attached are inserted into the first fastening hole 71 and the second fastening hole 72 of the storage body 70 so that the cover 50 is placed at the placement position, and after that, step S5 (the first fixing step) is performed while this state is maintained. With such a configuration, after step S4 (the placing step), the state where the cover 50 is placed at the placement position can be maintained by the placement jig 110 (the first positioning pin 115 and the second positioning pin 116) until step S5 (the first fixing step) is finished.

Accordingly, in step S5 (the first fixing step) of the present embodiment, the cover 50 can be fastened and fixed to the assembled battery intermediate body 80 (the storage body 70) with two attachment bolts 75 while the cover 50 is placed at the placement position by the placement jig 110. Hereby, when the cover 50 is fastened to the assembled battery intermediate body 80 (the storage body 70) with two attachment bolts 75, it is possible to prevent the cover 50 from being displaced from the placement position. Accordingly, in step S5 (the first fixing step), the cover 50 can be fixed appropriately at the placement position on the first surface 70b of the storage body 70.

Note that, as described above, the jig body portion 111 of the placement jig 110 has a rectangular shape with two chamfered corners so that, when the cover 50 is attached to the placement jig 110, the third bolt insertion portion 53 and the fourth bolt insertion portion 54 of the cover 50 are exposed above the placement jig 110 from the jig body portion 111 without being covered with the jig body portion 111. With the use of the placement jig 110 including the jig body portion 111 having such a shape, step S5 (the first fixing step) can be performed.

Further, as described above, in step S5 (the first fixing step) of the present embodiment, while the state where the sealing member 56 is brought into close contact with the sealing surface 49b via the placement jig 110 to which the cover 50 is attached is maintained, the cover 50 is fastened and fixed to the assembled battery intermediate body with two attachment bolts 75. With such a configuration, the cover 50 can be fixed to the assembled battery intermediate body 80 in the state where the sealing member 56 makes close contact with the sealing surface 49b, and deformation of the cover 50 can be restrained.

For example, as another method for fixing the cover to the assembled battery intermediate body in the state where the sealing member makes close contact with the sealing surface, the following method can be employed. More specifically, in a state where the sealing member is brought into contact with the sealing surface, a part (a fastened portion) of the sealing member is first sandwiched and compressed between the cover body portion and the sealing surface by force to fasten the cover to the assembled battery intermediate body with one attachment bolt, so that the part of the sealing member makes close contact with the sealing surface. After that, other attachment bolts are sequentially fastened one by one in a similar manner, so that the cover is fixed to the assembled battery intermediate body in the state where the sealing member makes close contact with the sealing surface.

However, such a method is a method in which the sealing member is compressed by force to fasten the cover to the assembled battery intermediate body with the attachment bolt, and therefore, at the time of the fastening with the attachment bolt, a large load is locally applied to a fastened portion of the cover (a part placed around the bolt insertion portion), so that the cover might deform.

On the other hand, in step S5 (the first fixing step) of the present embodiment, in the state where the whole annular sealing member 56 provided over the whole peripheral portion of the bottom face 55b of the cover body portion 55 is brought into close contact with the annular sealing surface 49b included in the first surface 70b of the storage body 70, the cover 50 is fastened to the assembled battery intermediate body 80 with the attachment bolts 75. That is, in a state where the sealing member 56 has been already compressed (in other words, in a state where a set load is applied to the whole peripheral portion of the bottom face 55b of the cover body portion 55), the cover 50 is fastened to the assembled battery intermediate body 80 with the attachment bolts 75.

On this account, in step S5 (the first fixing step) of the present embodiment, at the time of the fastening with the attachment bolts 75, it is possible to restrain a large load from being locally applied to the fastened portions of the cover 50 (a part, of the cover 50, that is placed around the third bolt insertion portion 53 and a part, of the cover 50, that is placed around the fourth bolt insertion portion 54), so that the deformation of the cover 50 can be restrained.

Further, the cover 50 is fixed to the assembled battery intermediate body 80 such that the whole annular sealing member 56 provided over the whole peripheral portion of the bottom face 55b of the cover body portion 55 makes close contact with the annular sealing surface 49b included in the first surface 70b of the storage body 70. This makes it possible to airtightly seal between the cover 50 and the first surface 70b (the sealing surface 49b) of the storage body 70. In the assembled battery 1 configured as such, in a case where gas leaks (is discharged) from the cells 10 for some abnormalities, for example, it is possible to prevent the gas from being discharged outside the assembled battery 1 from the cover 50 side (through between the cover 50 and the storage body 70).

Subsequently, the process proceeds to step S6 (a removing step) in which the placement jig 110 is removed from the cover 50. Hereby, the first positioning pin 115 and the second positioning pin 116 of the placement jig 110 are removed from the first bolt insertion portion 51 and the second bolt insertion portion 52 of the cover 50 and the first fastening hole 71 and the second fastening hole 72 of the storage body 70.

Figure 13:
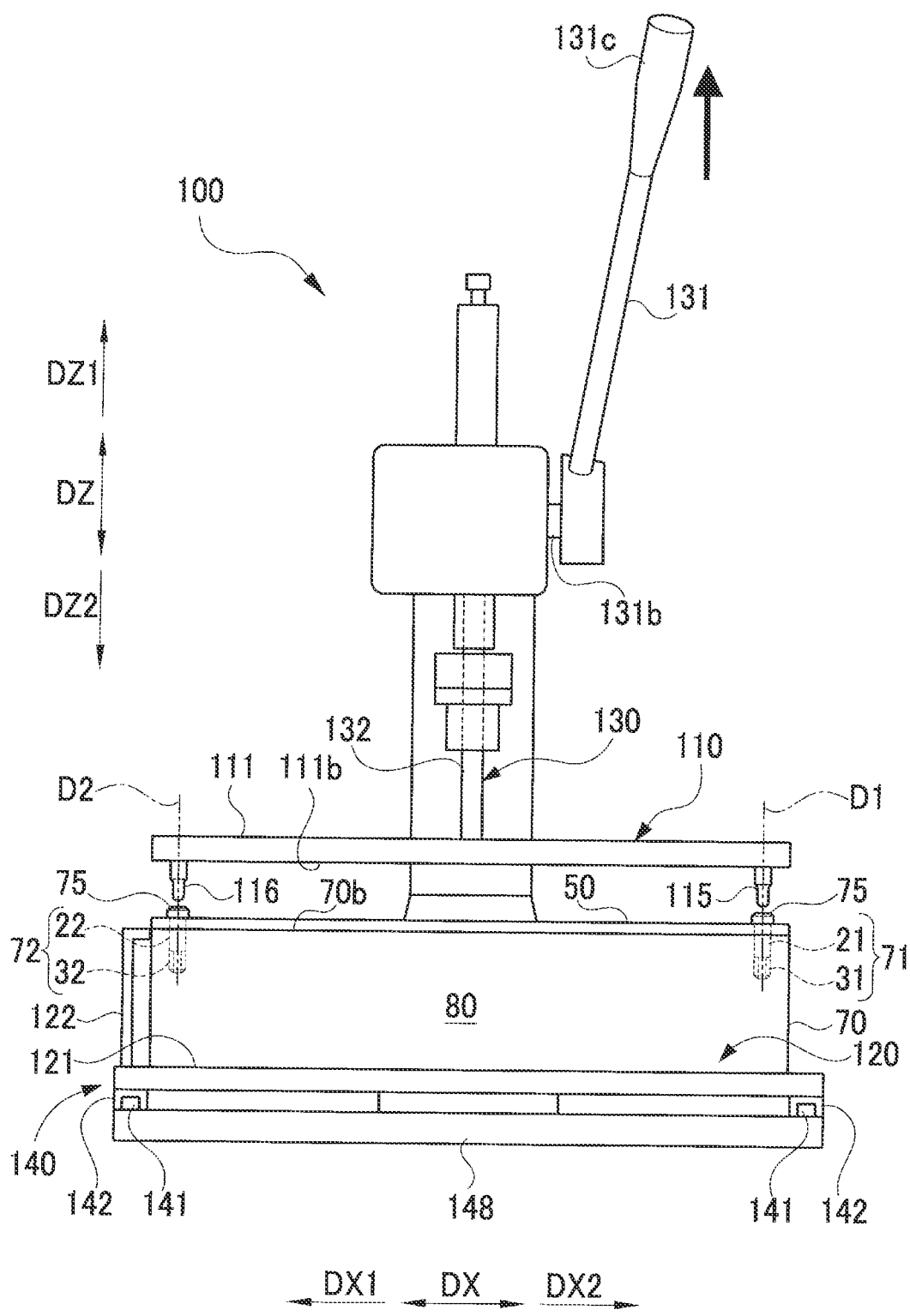
FIG. 13 is another view to describe the manufacturing method of the assembled battery according to the embodiment.

More specifically, as illustrated in FIG. 13, in terms of the placement device 100, the lever 131 is rotationally moved so that the handle portion 131c of the lever 131 moves to the upper direction DZ1, and hereby, the shaft 132 is moved to the upper direction DZ1. Thus, the magnets 112 of the placement jig 110 are separated from the cover 50 fixed to the assembled battery intermediate body 80 (the storage body 70) with two attachment bolts 75, and the placement jig 110 fixed to the lower end of the shaft 132 is moved to the upper direction DZ1 (a direction away from the first surface 70b of the storage body 70), so that the placement jig 110 can be removed from the cover 50.

In the present embodiment, when step S5 (the first fixing step) is performed, the cover 50 is fixed to the assembled battery intermediate body 80 with two attachment bolts 75. Accordingly, in step S6 (the removing step), by just moving the placement jig 110 to the upper direction DZ1 (the direction away from the first surface 70b) as described above, the magnets 112 of the placement jig 110 can be separated from the cover 50 and the placement jig 110 can be removed from the cover 50. As such, in the manufacturing method of the present embodiment, the cover 50 can be easily removed from the placement jig 110.

Figure 14:
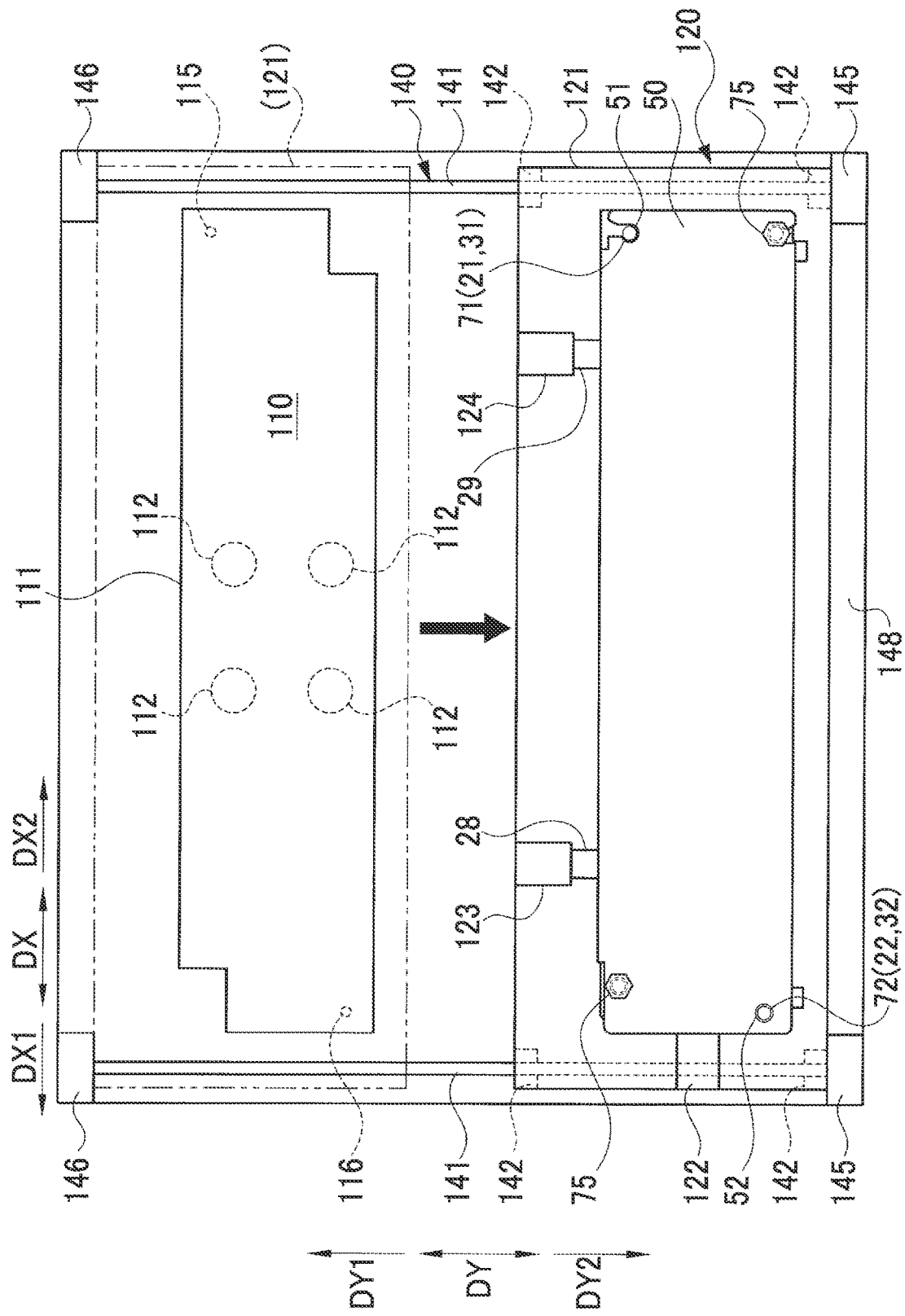
FIG. 14 is another view to describe the manufacturing method of the assembled battery according to the embodiment.

Then, the process proceeds to step S7 (a second fixing step) in which two remaining attachment bolts 75 are attached. More specifically, first, as illustrated in FIG. 14, in a state where the assembled battery intermediate body 80 is fixed to the top face 121b of the pedestal 121, the workpiece table 120 placed at the first position (a position indicated by an alternate long and two short dashes line in FIG. 14) is moved to the front direction DY2 (downward in FIG. 14) along the two rails 141 of the pedestal moving mechanism 140, so that the workpiece table 120 is placed at the second position (the position illustrated in FIG. 14). Hereby, the first bolt insertion portion 51 and the second bolt insertion portion 52 of the cover 50 are exposed upward (a state where they are not covered with the placement jig 110).

In this state, first, the shaft portion 75b of a first one of the two remaining attachment bolts 75 is passed through the first bolt insertion portion 51 of the cover 50 and then passed through the insertion hole 21 of the first fastening hole 71 of the storage body 70, and further, the male screw 75c of the first one of the two remaining attachment bolts 75 is engaged threadedly with the female screw 31b of the screw hole 31 of the first fastening hole 71. Further, the shaft portion 75b of a second one of the two remaining attachment bolts 75 is passed through the second bolt insertion portion 52 of the cover 50 and then passed through the insertion hole 22 of the second fastening hole 72 of the storage body 70, and further, the male screw 75c of the second one of the two remaining attachment bolts 75 is engaged threadedly with the female screw 32b of the screw hole 32 of the second fastening hole 72 (see FIG. 15). Hereby, the cover 50 can be fixed to the assembled battery intermediate body 80 with four attachment bolts 75 in total while the cover 50 is placed at the placement position on the first surface 70b of the storage body 70.

As described above, with the manufacturing method of the present embodiment, the cover 50 can be fixed to the assembled battery intermediate body 80 appropriately (with a high positional accuracy) in a state where the cover 50 is placed at the placement position on the first surface 70b of the storage body 70. After that, the resin cover 60 is attached to the assembled battery intermediate body 80 to which the cover 50 is attached, so that the assembled battery 1 illustrated in FIG. 1 is completed.

The disclosure has been described above in line with the embodiment, but the disclosure is not limited to the above embodiment and can be modified and applied appropriately without departing from the gist of the disclosure.

What is claimed is:

1. A manufacturing method of an assembled battery including
    an assembled battery intermediate body including a plurality of cells and a storage body in which the cells are accommodated,
    a cover placed at a placement position on a first surface of the storage body so as to cover the first surface, the cover being plate-shaped, the placement position being predetermined, and
    at least three attachment bolts with which the cover is attached to the assembled battery intermediate body,
    the storage body including at least three fastening holes on a first surface side of the storage body, the cover being attached to the assembled battery intermediate body with the fastening holes, and a shape of the fastening holes each including a female screw fitting a male screw formed in a shaft portion of the attachment bolt,
    the cover including at least three bolt insertion portions each constituted by a through-hole or a notch portion,
    the bolt insertion portions being placed at positions facing the fastening holes of the storage body when the cover is placed at the placement position,
    the cover being fixed to the assembled battery intermediate body in a state where the shaft portion is passed through the bolt insertion portion and the male screw is engaged threadedly with the female screw,
    the manufacturing method comprising:
    attaching the cover to a placement jig configured to place the cover at the placement position such that a surface of the cover makes contact with a surface of a jig body portion included in the placement jig and having a flat-plate shape;
    placing the cover at the placement position by moving the placement jig to which the cover is attached such that the placement jig approaches the assembled battery intermediate body fixed on a pedestal in a state where the first surface faces the cover; and
    fastening and fixing the cover to the assembled battery intermediate body with the attachment bolts such that the shaft portion is passed through the bolt insertion portion of the cover placed at the placement position and the male screws of the attachment bolts are engaged threadedly with the female screws of the fastening holes facing the bolt insertion portions, wherein:

the placement jig includes at least two positioning pins projecting from the surface of the jig body portion;

when the cover is attached to the placement jig, the positioning pins are respectively passed through a first bolt insertion portion and a second bolt insertion portion as the bolt insertion portions, such that the cover is positioned with respect to the placement jig;

in placing the cover, the positioning pins are placed at positions where the positioning pins are respectively inserted into a first fastening hole and a second fastening hole as the fastening holes when the cover attached to the placement jig is placed at the placement position;

in attaching the cover, the positioning pins are respectively passed through the first bolt insertion portion and the second bolt insertion portion of the cover, such that the cover is attached to the placement jig; and in placing the cover, the positioning pins are respectively inserted into the first fastening hole and the second fastening hole such that the cover is placed at the placement position.

2. The manufacturing method according to claim 1, wherein:

the assembled battery includes four attachment bolts;

the storage body has a rectangular outer shape in a plan view viewed from the first surface side;

four fastening holes are provided with the first surface such that the fastening holes are respectively placed at four corners of the storage body in the plan view viewed from the first surface side;

the cover has a rectangular shape such that four bolt insertion portions are respectively placed at four corners of the cover;

the positioning pins extend straight in an axis direction;

the first bolt insertion portion and the second bolt insertion portion are respectively placed at two corners out of the four corners of the cover, the two corners of the cover being placed on one diagonal line of the cover; and the first fastening hole and the second fastening hole are respectively placed at two corners out of the four corners of the storage body, the two corners of the storage body being placed on one diagonal line of the storage body in the plan view viewed from the first surface side.

3. The manufacturing method according to claim 2, wherein:

the jig body portion has a rectangular shape with two chamfered corners such that, when the cover is attached to the placement jig, a third bolt insertion portion and a fourth bolt insertion portion among the four bolt insertion portions are exposed from the jig body portion without being covered with the jig body portion, the third bolt insertion portion and the fourth bolt insertion portion being different from the first bolt insertion portion and the second bolt insertion portion; and in fastening and fixing the cover to the assembled battery intermediate body, the cover is fixed to the assembled battery intermediate body with two attachment bolts among the four attachment bolts in such a manner that, while a state where the positioning pins are respectively inserted into the first fastening hole and the second fastening hole of the storage body and the cover is placed at the placement position is maintained, the shaft portion of a first attachment bolt among the two attachment bolts is passed through the third bolt insertion portion of the cover and the male screw of the first attachment bolt is engaged threadedly with the female screw of a third fastening hole facing the third bolt insertion portion among the four fastening holes of the storage body, and the shaft portion of a second attachment bolt among the two attachment bolts is passed through the fourth bolt insertion portion of the cover and the male screw of the second attachment bolt is engaged threadedly with the female screw of a fourth fastening hole facing the fourth bolt insertion portion among the four fastening holes of the storage body, the cover is fixed to the assembled battery intermediate body with the four attachment bolts in such a manner that the placement jig is removed from the cover after fixing the cover to the assembled battery intermediate body with the two attachment bolts, such that the positioning pins are removed from the first bolt insertion portion and the second bolt insertion portion of the cover and the first fastening hole and the second fastening hole of the storage body, and the shaft portion of a third attachment bolt among the four attachment bolts is passed through the first bolt insertion portion of the cover and the male screw of the third attachment bolt is engaged threadedly with the female screw of the first fastening hole of the storage body, and the shaft portion of a fourth attachment bolt among the four attachment bolts is passed through the second bolt insertion portion of the cover and the male screw of the fourth attachment bolt is engaged threadedly with the female screw of the second fastening hole of the storage body.

4. The manufacturing method according to claim 3, wherein:

a magnet is provided on the surface of the jig body portion;

the cover includes a cover body portion made of a magnetic body, the cover body portion has a plate shape;

in the attaching of the cover, the cover is attached to the placement jig such that the cover body portion is connected to the magnet by magnetic force of the magnet; and after fixing the cover to the assembled battery intermediate body with the two attachment bolts but before fixing the cover to the assembled battery intermediate body with the four attachment bolts, the placement jig is moved in a direction where the surface of the jig body portion is distanced from the cover, such that the magnet is separated from the cover fixed to the assembled battery intermediate body with the two attachment bolts and the cover is removed from the placement jig.

5. The manufacturing method according to claim 3, wherein:

the cover includes a cover body portion with a plate shape, and an annular sealing member provided over a whole peripheral portion of the cover body portion;

in placing the cover, the cover is placed at the placement position such that, in a state where the positioning pins of the placement jig to which the cover is attached are respectively inserted into the first fastening hole and the second fastening hole of the storage body such that the sealing member is brought into contact with an annular sealing surface included in the first surface, a load is applied to the cover in a direction where the cover approaches the first surface via the placement jig, such that the sealing member is sandwiched and compressed between the cover body portion and the sealing surface of the first surface and the sealing member is brought into close contact with the sealing surface; and in fixing the cover to the assembled battery intermediate body with the two attachment bolts, while a state where the sealing member is brought into close contact with the sealing surface via the placement jig to which the cover is attached is maintained, the cover is fastened and fixed to the assembled battery intermediate body with the two attachment bolts.

6. The manufacturing method according to claim 1, wherein:

a magnet is provided on the surface of the jig body portion;

the cover includes a cover body portion made of a magnetic body, the cover body portion has a plate shape; and in attaching the cover, the cover is attached to the placement jig such that the cover body portion is connected to the magnet by magnetic force of the magnet.

7. The manufacturing method according to claim 1, wherein:

the cover is attached and the cover is placed by use of a placement device including the placement jig, the pedestal, a placement jig moving mechanism, and a pedestal moving mechanism, the placement jig moving mechanism being configured to move the placement jig in a direction where the surface of the jig body portion is distanced from the cover and in a direction where the surface of the jig body portion approaches the cover, the pedestal moving mechanism being configured to move the pedestal in a direction where the surface of the jig body portion is distanced from the cover and in a direction where the surface of the jig body portion approaches the cover;

the placement device is configured such that, when the pedestal on which the assembled battery intermediate body is fixed is placed at a first position by use of the pedestal moving mechanism, a first positioning pin out of the two positioning pins and the first fastening hole face each other in an axis direction of the first positioning pin and a second positioning pin out of the two positioning pins and the second fastening hole face each other in an axis direction of the second positioning pin;

in attaching the cover, the cover is attached to the placement jig such that the positioning pins of the placement jig are respectively passed through the first bolt insertion portion and the second bolt insertion portion of the cover; and in placing the cover, the cover is placed at the placement position on the first surface of the storage body such that, in a state where the pedestal on which the assembled battery intermediate body is fixed is placed at the first position, the placement jig to which the cover is attached is moved by use of the placement jig moving mechanism in the direction where the surface approaches the cover, such that the positioning pins of the placement jig to which the cover is attached are respectively inserted into the first fastening hole and the second fastening hole.

* * * * *